(12) United States Patent
Kitaguchi et al.

(10) Patent No.: US 7,310,154 B2
(45) Date of Patent: Dec. 18, 2007

(54) SHAPE MEASUREMENT SYSTEM

(75) Inventors: Takashi Kitaguchi, Kanagawa (JP); Norihiko Murata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 957 days.

(21) Appl. No.: 09/920,762

(22) Filed: Aug. 3, 2001

(65) Prior Publication Data

US 2002/0041282 A1   Apr. 11, 2002

(30) Foreign Application Priority Data

Aug. 8, 2000   (JP)   ............................. 2000-240470

(51) Int. Cl.
| | |
|---|---|
| G01B 11/24 | (2006.01) |
| G01B 11/30 | (2006.01) |
| G06K 9/00 | (2006.01) |
| G01C 9/00 | (2006.01) |
| G01C 17/00 | (2006.01) |
| G01C 19/00 | (2006.01) |
| G06F 19/00 | (2006.01) |
| G01N 21/86 | (2006.01) |
| G01V 8/00 | (2006.01) |
| H04N 5/225 | (2006.01) |
| H04N 9/04 | (2006.01) |
| H04N 5/228 | (2006.01) |

(52) U.S. Cl. ...................... 356/603; 382/154; 702/152; 250/559.22; 348/207.99; 348/208.99

(58) Field of Classification Search ............ 348/218.1, 348/207.99, 207.1, 207.11, 208.99, 208.1–208.4; 356/601–640; 382/154, 284–286, 293–297; 702/150–155; 250/559.01–559.33
See application file for complete search history.

(56) References Cited

U.S. PATENT DOCUMENTS 4,657,394 A *   4/1987   Halioua ...................... 356/604

(Continued)

FOREIGN PATENT DOCUMENTS

JP   5-149727   6/1993

(Continued)

*Primary Examiner*—Gregory J. Toatley, Jr.
*Assistant Examiner*—Gordon J. Stock, Jr.
(74) *Attorney, Agent, or Firm*—Oblon, Spivak, McClelland, Maier & Neustadt, P.C.

(57) ABSTRACT

An image capturing apparatus for capturing an image of an object. The image capturing apparatus includes a correspondence detector which detects a correspondence of characteristic points of an object based upon captured images of the object. A motion detector detects a motion of the image capturing device. The motion detector includes magnetic sensors. Further, a shape calculator calculates a shape of the object based upon the captured image data, captured attitude information, a translation component, and the correspondence of the characteristic points. The motion detector may further include acceleration sensors and angle speed sensors. A disturbance detector may further be provided to detect a disturbance in acceleration signals output by the acceleration sensors and a disturbance in magnetic signals output by the magnetic sensors. In this situation, if a disturbance arises in the acceleration signals output by the acceleration sensors, an attitude of the image capturing apparatus can be based on signals output by the magnetic sensors and signals output by the angle speed sensors. Similarly, if a disturbance arises in the magnetic signals output by the magnetic sensors, an attitude of the image capturing apparatus can be determined utilizing the acceleration signals output by the acceleration sensors and the angle speed signals output by the angle speed sensors.

34 Claims, 16 Drawing Sheets

U.S. PATENT DOCUMENTS

| | | | |
|---|---|---|---|
| 5,175,601 A * | 12/1992 | Fitts | 356/604 |
| 5,475,422 A * | 12/1995 | Mori et al. | 348/48 |
| 5,852,672 A * | 12/1998 | Lu | 382/154 |
| 5,870,136 A * | 2/1999 | Fuchs et al. | 348/42 |
| 6,038,074 A | 3/2000 | Kitaguchi et al. | |
| 6,104,840 A * | 8/2000 | Ejiri et al. | 382/284 |
| 6,141,105 A * | 10/2000 | Yahashi et al. | 356/623 |
| 6,369,899 B1 * | 4/2002 | Hamada | 356/603 |
| 6,438,272 B1 * | 8/2002 | Huang et al. | 382/286 |
| 6,466,701 B1 * | 10/2002 | Ejiri et al. | 382/284 |
| 6,522,787 B1 * | 2/2003 | Kumar et al. | 382/268 |
| 6,600,168 B1 * | 7/2003 | Geng | 250/559.22 |
| 6,639,685 B1 * | 10/2003 | Gu et al. | 356/603 |
| 6,640,004 B2 * | 10/2003 | Katayama et al. | 382/154 |
| 6,700,669 B1 * | 3/2004 | Geng | 356/603 |
| 6,765,606 B1 * | 7/2004 | Iddan et al. | 348/42 |
| 6,823,080 B2 * | 11/2004 | Iijima et al. | 382/154 |
| 6,914,685 B2 * | 7/2005 | Chang | 356/610 |
| 6,980,302 B2 * | 12/2005 | Knighton et al. | 356/607 |
| 7,123,292 B1 * | 10/2006 | Seeger et al. | 348/218.1 |
| 7,206,080 B2 * | 4/2007 | Kochi et al. | 356/611 |
| 7,215,809 B2 * | 5/2007 | Sato et al. | 382/154 |
| 2002/0113878 A1 * | 8/2002 | Iwai et al. | 348/187 |

FOREIGN PATENT DOCUMENTS

| | | |
|---|---|---|
| JP | 10-79029 | 3/1998 |
| JP | 2000-46530 | 2/2000 |
| JP | 2000-171924 | 6/2000 |

* cited by examiner (GRAVITATION DIRECTION)

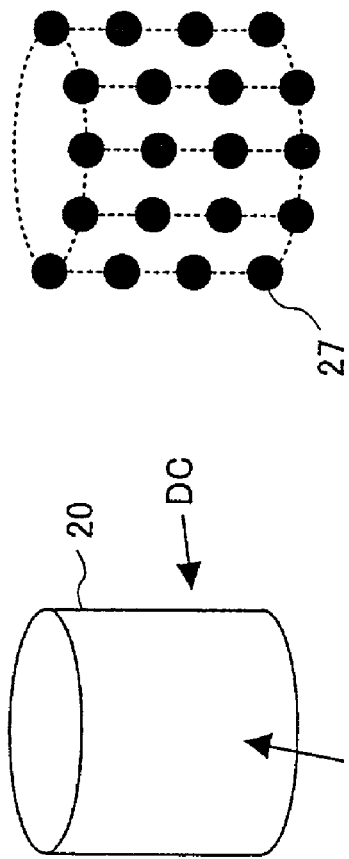
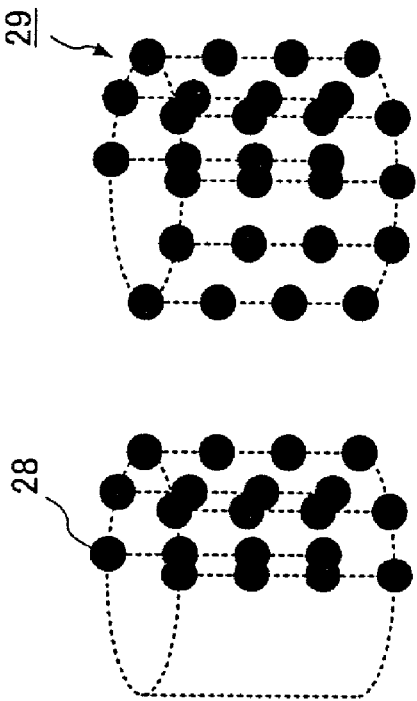
FIG. 7A  FIG. 7B  FIG. 7C  FIG. 7D

DD1    DE1

DD2    DE2

SHAPE MEASUREMENT SYSTEM

BACKGROUND OF THE INVENTION

1. Field of the Invention

The present invention generally relates to a computer inputting technology, a human interface technology, and a sight processing technology, and, in particular, to a technology of measuring a three-dimensional shape of an object.

2. Description of the Related Art

Conventionally, to measure a three-dimensional shape of an object (subject) has been demanded in various fields such as survey of land/building, production of CAD model, display of products/goods in on-line shopping, and so forth. As one of such three-dimensional shape measuring methods, there is a method by which a pattern light is irradiated/projected onto an object, a picture of distortion occurring in the pattern on the object is taken, and, thus, shape measurement is performed.

Specifically, Japanese Laid-Open Patent Application No. 5-149727 discloses to take a picture of a subject by a camera which can move freely on a moving apparatus on which the camera is mounted, and thereby, to measure a shape of the subject even when the subject has a surface having high reflectance. Further, Japanese Laid-Open Patent Application No. 10-79029 discloses to divide each of a plurality of sets of image data taken by a plurality of cameras into small regions, to combine three-dimensional information obtained from the respective small regions, and, thus, to detect three-dimensional information of the subject.

However, the above-mentioned technique requires the moving apparatus or plurality of cameras. Thereby, the apparatus becomes larger, and cannot be carried easily. Thus, the apparatus is not convenient. Furthermore, high manufacturing costs are needed for such apparatuses. Furthermore, depending on the actual arrangement of the moving apparatus or plurality of cameras, characteristics of a subject for which the shape thereof can be properly measured may be limited.

SUMMARY OF THE INVENTION

The present invention has been devised in order to solve these problems, and, an object of the present invention is to achieve measurement of three-dimensional shape at high accuracy which can be used in various conditions, and, to provide a shape measurement system and a picture taking device which are as a whole miniaturized and inexpensive, the shape measurement method, and a recording medium in which a software program for performing the shape measurements method is recorded.

A shape measurement system according to the present invention for measuring a three-dimensional shape of a subject, comprises:

a picture taking part taking a picture of the subject;

a projecting part applying light having a predetermined pattern onto the subject;

a picture taking position specifying part detecting a position at which the picture taking part takes the picture of the subject, and generating position information specifying the position;

a three-dimensional shape composing part expressing the each point by a coordinate in a single coordinate system and generating a composite image in accordance with at least two three-dimensional coordinates calculated for the each point by the three-dimensional coordinate calculating part based on respective images obtained as a result of a picture of the subject on which the light having the predetermined pattern is applied being taken from at least two different positions.

Thereby, by three-dimensional coordinates calculated in accordance with position information and images obtained through taking pictures of a subject, a three-dimensional shape of the subject is obtained. Accordingly, it is possible to measure a three-dimensional shape at a high accuracy through a simple configuration. Thereby, it is possible to miniaturize the shape measurement system, simplify the shape measurement operation, and to provide the shape measurement system in which reliability is improved.

The shape measurement system may further comprise:

a picture taking control part controlling operation timing of the picture taking part;

a signal converting part converting an analog signal obtained by the picture taking part into a digital signal; and a storing part storing the digital signal, three-dimensional coordinate and composite image.

The shape measurement system may further comprise an interpolation part performing interpolation processing on at least one of the images obtained by the picture taking part and the composite image obtained by the three-dimensional shape composing part. Thereby, it is possible to obtain a three-dimensional shape at a higher accuracy.

The shape measurement system may further comprise a three-dimensional image generating part generating a three-dimensional image of the subject in accordance with coordinates of the subject obtained by the three-dimensional coordinate calculating part and an image obtained when the light having the predetermined pattern is not applied onto the subject by the picture taking part. Thereby, it is possible to obtain a three-dimensional image in which even a pattern and so forth actually provided on the subject is reproduced. Thus, it is possible to obtain faithfully reproduced three-dimensional image of the subject.

A shape measurement system according to another aspect of the present invention for measuring a three-dimensional shape of a subject, comprises:

a plurality of picture taking parts with different optical centers taking pictures of the subject;

a projecting part applying light having a predetermined pattern onto the subject;

a picture taking position specifying part detecting positions at which the plurality of picture taking parts take the pictures of the subject, and generating position information specifying the respective positions;

a three-dimensional coordinate calculating part calculating a three-dimensional coordinate of each point of the subject for each image in accordance with a plurality of images obtained as a result of pictures of the subject being taken by the plurality of picture taking parts, and the position information generated by the picture taking position specifying part; and a three-dimensional shape composing part expressing the each point by a coordinate in a single coordinate system and generating a composite image in accordance with the plurality of three-dimensional coordinates calculated for the each point by the three-dimensional coordinate calculating part.

Thereby, it is possible to obtain a plurality of images through the plurality of picture taking parts simultaneously. Accordingly, by calculating three-dimensional coordinates from the plurality of images, respectively, and combining them, it is possible to achieve measurement of three-dimensional shape at a higher accuracy. Thereby, it is possible to further improve the reliability of the shape measurement system.

The shape measurement system may further comprise:

picture taking control parts each controlling operation timing of each of the plurality of picture taking parts;

signal converting parts converting an analog signals obtained by the picture taking parts into digital signals, respectively; and a storing part storing these digital signals, three-dimensional coordinates obtained from the three-dimensional coordinate calculating part and the composite image.

A shape measurement system according to another aspect of the present invention for measuring a three-dimensional shape of a subject, comprises a picture taking device taking a picture of a subject and a computer. The picture taking device comprises:

a projecting part applying light having a predetermined pattern onto the subject; and a picture taking position specifying part detecting a position at which the picture taking part takes the picture of the subject, and generating position information specifying the position; and the computer comprises:

a three-dimensional coordinate calculating part calculating a three-dimensional coordinate of each point of the subject in accordance with the position information and an image taken at the position specified by the position information; and a three-dimensional shape composing part expressing the each point by a coordinate in a single coordinate system and generating a composite image in accordance with at least two three-dimensional coordinates calculated for the each point by the three-dimensional coordinate calculating part based on respective images obtained as a result of the picture of the subject on which the light having the predetermined pattern is applied being taken from at least two different positions.

Thereby, by three-dimensional coordinates calculated through the computer in accordance with position information and images obtained through taking pictures of a subject obtained through the picture taking device, a three-dimensional shape of the subject is obtained through the computer. Accordingly, it is possible to measure a three-dimensional shape at a high accuracy through a simple configuration. In this system, by utilizing the performance of the computer, it is possible to provide a three-dimensional image having a higher accuracy.

The computer may have an interpolation part which performs interpolation processing on the plurality of three-dimensional coordinates calculated by the three-dimensional coordinate calculating part.

At least one of the projecting part and picture taking position specifying part may be controlled by the computer.

A picture taking device according to the present invention comprises a picture taking part taking a picture of a subject, and further comprises:

a projecting part applying light having a predetermined pattern onto the subject;

a picture taking position specifying part detecting a position at which the picture taking part takes the picture of the subject, and generating position information specifying the position; and a storing part storing an image obtained as a result of a picture of the subject being taken by the picture taking part, and the position information.

Thereby, it is possible to easily obtain data for measuring a three-dimensional shape of a subject.

At least one of the projecting part and the picture taking position specifying part may be controlled by a control signal provided externally.

The picture taking part may also take a picture of the subject onto which the light having the predetermined pattern is not applied. Thereby, it is possible to generate a reproduced image of a subject including a pattern or the like provided on the subject.

A shape measurement method of measuring a three-dimensional shape of a subject, comprising the steps of:

a) applying light having a predetermined pattern onto the subject;

b) detecting a position at which the step a) takes the picture of the subject, and generating position information specifying the position;

c) calculating a three-dimensional coordinate of each point of the subject in accordance with the position information and an image taken at the position specified in the step b); and d) expressing the each point by a coordinate in a single coordinate system in accordance with at least two three-dimensional coordinates calculated for each point in the step c) based on respective images obtained as a result of the picture of the subject on which the light having the predetermined pattern is applied being taken from at least two different positions in the step a).

Thereby, by three-dimensional coordinate calculated in accordance with position information and image obtained through taking a picture of a subject, a three-dimensional shape of the subject is obtained. Accordingly, it is possible to easily measure a three-dimensional shape at a high accuracy.

The method may further comprise the step of:

e) generating a three-dimensional image of the subject in accordance with the coordinates of the subject in the coordinate system, and an image of the subject obtained in the step a) but when the light having the predetermined is not applied thereonto. Thereby, it is possible to generate a three-dimensional reproduced image which is faithful to the subject even for a pattern or the like provided on the subject.

A shape measurement method of measuring a three-dimensional shape of a subject according to another aspect of the present invention, comprises the steps of:

a) applying light having a predetermined pattern onto the subject;

b) taking pictures of the subject through a plurality of picture taking parts having direction optical centers;

c) detecting positions at which the plurality of picture taking parts take the pictures of the subject, and generating position information specifying the positions, respectively;

d) calculating a three-dimensional coordinate of each point of the subject for each image in accordance with a plurality of images obtained as a result of pictures of the subject on which the light having the predetermined pattern is applied being taken by the plurality of picture taking parts, and the position information generated in the step c); and e) expressing the each point by a coordinate in a single coordinate system in accordance with the three-dimensional coordinates of the each point calculated in the step d).

Thereby, it is possible to obtain a plurality of images through the plurality of picture taking parts simultaneously. Accordingly, by calculating three-dimensional coordinates from the plurality of images, respectively, and combining them, it is possible to achieve measurement of three-dimensional shape at a higher accuracy.

A computer readable recording medium according to the present invention in which a program for measuring a three-dimensional shape of a subject through a compute is provided. The program causes the computer to:

calculate a three-dimensional coordinate of each point of the subject in accordance with an image obtained as a result of the picture of the subject on which light having a predetermined pattern is applied being taken and position information specifying a position at which the picture of the subject is thus taken; and express the each point by a coordinate in a single coordinate system in accordance with at least two three-dimensional coordinates calculated for the each point based on respective images obtained as a result of the picture of the subject on which the light having the predetermined pattern is applied being taken from at least two different positions.

Thereby, by three-dimensional coordinate calculated in accordance with position information and image obtained through taking a picture of a subject through execution of a software program by a computer, a three-dimensional shape of the subject is obtained. Accordingly, it is possible to easily measure a three-dimensional shape at a high accuracy through the software program.

The program may cause an acceleration sensor to generate the position information specifying the position with respect to a gravitation; and a magnetic sensor to generate the position information specifying the position with respect to terrestrial magnetism.

The program may cause an angular velocity sensor to detect a rotational angular velocity around each coordinate axis of the three-dimensional coordinate system.

The program may further cause the computer to generate a three-dimensional image of the subject in accordance with the coordinates of the subject in the single coordinate system, and an image of the subject obtained through taking the picture of the subject but on which the light having the predetermined pattern is not applied. Thereby, it is possible to generate a three-dimensional reproduced image which is faithful to the subject even for a pattern or the like provided on the subject.

A computer readable recording medium according to another aspect of the present invention for measuring a three-dimensional shape of a subject through a computer is provided. The program causes the computer to:

calculate a three-dimensional coordinate of each point of the subject for each image in accordance with a plurality of images obtained as a result of pictures of the subject on which the light having the predetermined pattern is applied being taken by the plurality of picture taking parts, and the position information specifying positions at which the pictures of the subject are taken by the plurality of picture taking parts; and express the each point by a coordinate in a single coordinate system in accordance with the thus-calculated three-dimensional coordinates for the each point.

Thereby, it is possible to obtain a plurality of images through the plurality of picture taking parts simultaneously through execution of a software program by a computer. Accordingly, by calculating three-dimensional coordinates from the plurality of images, respectively, and combining them, it is possible to achieve measurement of three-dimensional shape at a higher accuracy.

Other objects and further features of the present invention will become more apparent from the following detailed description when read in conjunction with the accompanying drawings.

BRIEF DESCRIPTION OF THE DRAWINGS

FIGS. 7A through 7D and 8A through 8B illustrate three-dimensional coordinate composing operation performed by the shape measurement system shown in FIG. 1;

DETAILED DESCRIPTION OF THE PREFERRED EMBODIMENTS

Figure 1:
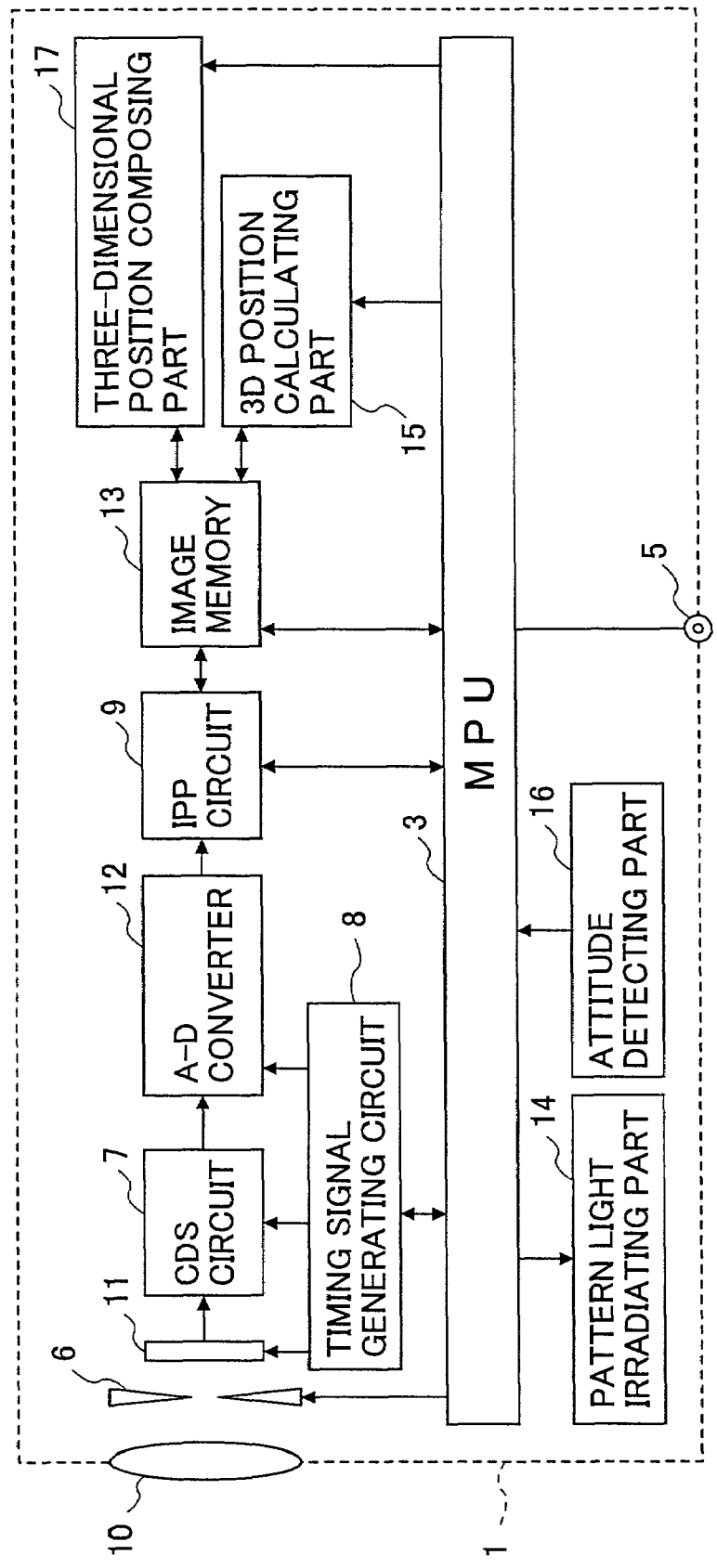
FIG. 1 shows a block diagram of a shape measurement system in a first embodiment according to the present invention.

Embodiments of the present invention will now be described in detail with reference to figures. The same reference numerals represent same or corresponding parts/components.

FIG. 1 shows a block diagram of a shape measurement system in a first embodiment of the present invention. As shown in FIG. 1, the shape measurement system 1 in the first embodiment includes an MPU (Micro Processing Unit) 3, an external terminal 5, a stop (aperture) mechanism 6, a correlated double sampling circuit (CDS) 7, a timing signal generating circuit 8, an IPP (Image Pre-Processor) circuit 9, a lens 10, a picture taking device 11 such as a CCD, an A-D converter 12, an image memory 13, a pattern light irradiating part 14, a 3D (three-dimensional) position calculating part 15, an attitude detecting part 16 and a three-dimensional position composing part 17.

The CDS circuit 7 is connected to the picture taking device 11, and the A-D converter 12 is connected to the CDS circuit 7. Further, the IPP circuit 9 is connected to the A-D converter 12, and the image memory 13 is connected to the IPP circuit 9. Furthermore, the 3D position calculating part 15 and three-dimensional position composing part 17 are connected to the image memory 13.

The picture taking device 11, CDS circuit 7 and A-D converter 12 are connected to the timing signal generating circuit 8. The external terminal 5, stop mechanism 6, timing signal generating circuit 8, IPP circuit 9, image memory 13, 3D position calculating part 15, three-dimensional position composing part 17, pattern light irradiating part 14 and attitude detecting part 16 are connected to the MPU 3.

In the above-described shape measurement system 1, when a picture of a subject (not shown in the figure) is taken, an image of the subject is formed on the picture taking device 11 through the lens 10 and stop mechanism 6. Then, an image signal thus obtained through the picture taking device 11 is sampled by the CDS circuit 7, and, then, is converted into a digital signal through the A-D converter 12. Operating timing in this occasion is controlled by a signal provided by the timing signal generating circuit 8.

The thus-obtained digital image signal undergoes image processing such as aperture correction and/or data compressing through the IPP circuit 9, and then is stored in the image memory 13. In this occasion, it is also possible that the MPU 3 performs the various correction processing and/or compressing processing on the image signal.

The pattern light irradiating part 14 irradiates/projects pattern light having a slit pattern, a dot pattern, or tone gradation onto the subject. Then, based on a picture/image taken from the subject on which the pattern light is irradiated/projected, the 3D position calculating part 15 calculates three-dimensional coordinates of points present on the surface of the subject.

The attitude detecting part 16 detects attitude (picture taking position, picture taking angle and so forth) of the shape measurement system 1 at an occasion of taking a picture of the subject. The above-mentioned attitude is detected each time a picture is taken by the system 1. Information such as the above-mentioned picture taking position, picture taking angle and so forth may be absolute, or may be relative with respect to a viewpoint.

The three-dimensional position composing part 17 combines a plurality of images obtained as a result of pictures of the subject being thus taken, in accordance with information concerning the corresponding to attitudes obtained through the attitude detecting part 16, and, thereby, obtains a three-dimensional shape of the subject. The respective circuits shown in FIG. 1 are controlled by the MPU 3 directly or indirectly.

Figure 2:
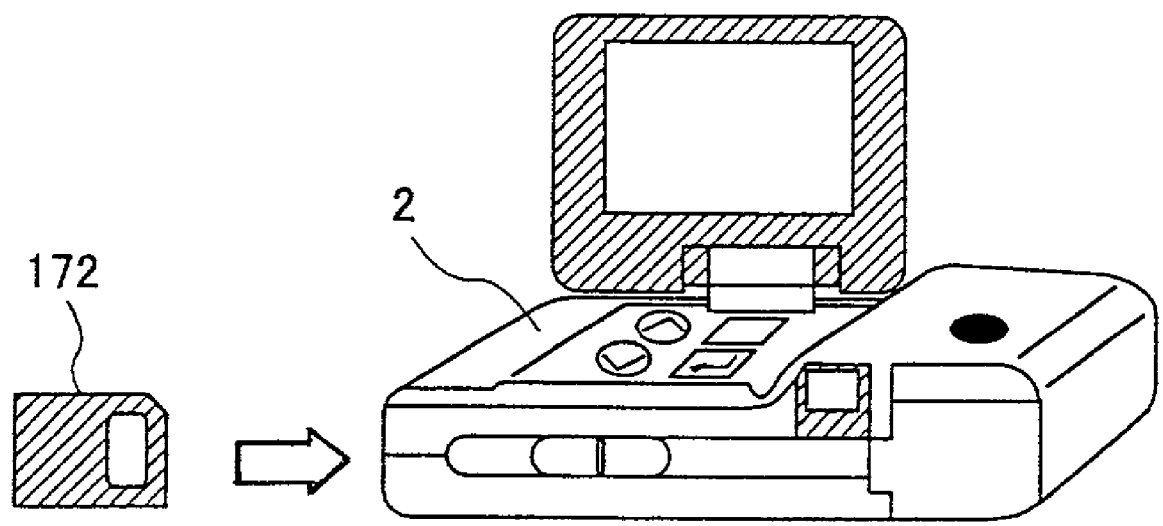
FIG. 2 shows an outline of a camera in which the shape measurement system shown in FIG. 1 is included.

The above-described shape measurement system 1 may be formed as a form of a camera 2 as shown in FIG. 2 as a result of being contained in a housing. A carriable recording medium such as a floppy disk 172 may be loaded into the camera 2, and, thereby, the generated three-dimensional image can be stored in the carriable recording medium by the camera 2.

Figure 3:
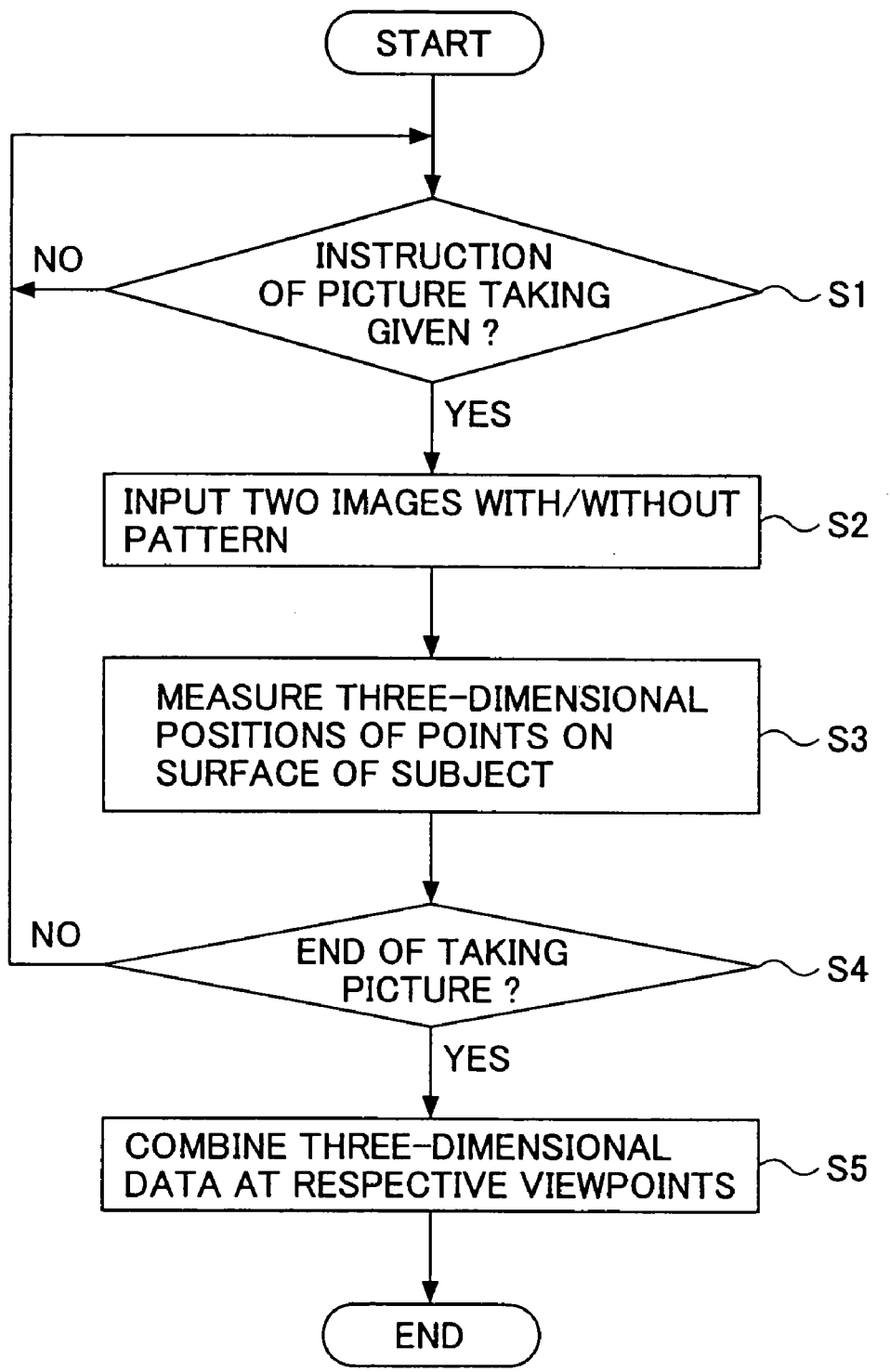
FIG. 3 shows an operation flow chart which illustrates operation of the shape measurement system shown in FIG. 1.

Operation performed by the above-mentioned shape measurement system 1 will now be described in detail with reference to FIG. 3. In a step S1, it is determined whether or not a user gives instructions of taking a picture. When instructions of taking a picture are given, a step S2 is performed. When no instructions of taking a picture are given, such instructions are waited for by the system 1 in step S4. At this occasion, as a result of a release button (manual button) being pressed by the user at a first viewpoint, the step S2 is performed, and a picture of the subject is taken.

First, the above-mentioned pattern light is applied onto the subject by the pattern light irradiating part 14, and, then, a picture of the subject on which the pattern light is projected is taken. Then, a picture of the same subject but on which the pattern light is not applied is also taken. In the shape measurement system 1, it is also possible that previously obtained image data is input to the image memory 13 through the external terminal 5, instead of taking a picture of the subject.

Figure 4:
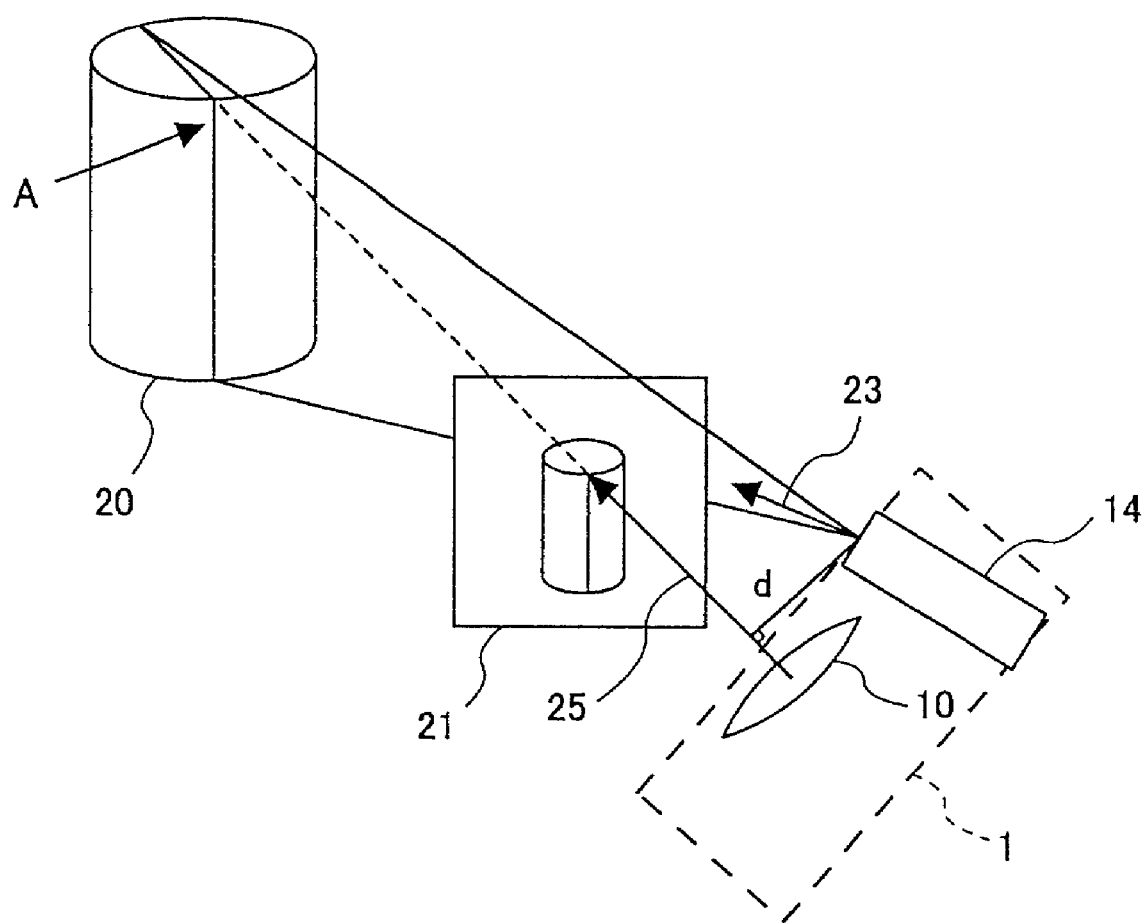
FIG. 4 illustrates picture taking operation of the shape measurement system shown in FIG. 1.

Then, in a step S3, the attitude of the system 1 at the occasion of taking the picture is detected, and three-dimensional coordinates of points present on the surface of the subject are calculated. How to detect the attitude will be described later in detail. As shown in FIG. 4, it is assumed that a picture of the subject 20 onto which the pattern light is projected by the pattern light irradiating part 14 is taken, and, thus, an image 21 is obtained. Then, a three-dimensional coordinate (Ax, Ay, Az) of a point A present on the subject 20 shown in FIG. 4 is calculated as follows:

The above-mentioned three-dimensional coordinate (Ax, Ay, Ax) can be calculated by the following formula (1) according to the principle of triangulation:

$$A_z = \frac{d}{\frac{I_x}{f} - P_x} \quad (1)$$

$$A_x = I_x \frac{A_z}{f}$$

$$A_y = I_y \frac{A_z}{f}$$

where:

(Px) denotes a vector 23 representing a direction in which the pattern light is applied;

(Ix, Iy) denotes a positional coordinate of the point A on the image 21 assuming that the point at which the optical axis of the lens 10 and the image surface intersect is the origin;

f denotes the focal length of the picture taking system including the lens 10; and d denotes the distance between the pattern light irradiating part 14 and the optical center 25 of the above-mentioned picture taking optical system.

Then, a picture of the subject is taken again from a second viewpoint other than the above-mentioned first viewpoint similarly to the above-mentioned operation. Then, based on a thus-obtained image, the three-dimensional coordinates of points on the surface of the subject are calculated similarly to the above-mentioned operation. The operation of taking a picture from the second viewpoint is performed in a manner such that at least some points on the surface of the subject taken from the first viewpoint are included in the image obtained in the operation of taking a picture from the second viewpoint.

Then, after a picture of the subject 20 is taken from a plurality of viewpoints as mentioned above, a step S4 is performed for finishing taking picture of the same subject 20, but the step S1 is performed again for continuing taking picture of the same subject 20.

In the step S5, the three-dimensional position composing part 17 combines three-dimensional coordinates (three-dimensional positional data) calculated for the above-mentioned respective viewpoints on a single coordinate system according to information concerning the corresponding attitudes detected by the attitude detecting part 16. A concrete example of the combination/composing operation will be described later.

Further, in the step S5, the image obtained through taking a picture of the subject on which the above-mentioned pattern light is not projected is combined with the three-dimensional shape obtained through the above-mentioned combination. Thereby, a three-dimensional image of the subject in which also an original pattern present on the surface of the subject is reproduced can be obtained.

Figure 5:
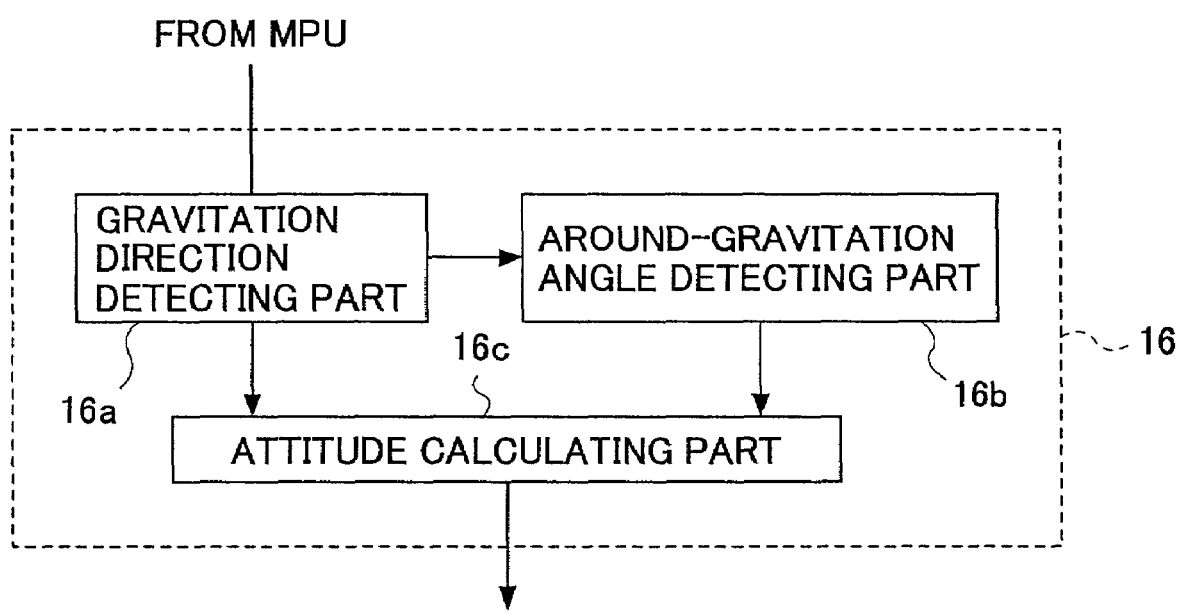
FIG. 5 is a block diagram of an attitude detecting part shown in FIG. 1.

The operation in the step S3 performed by the attitude detecting part 16 will now be described in detail. First, as shown in FIG. 5, the attitude detecting part 16 includes a gravitation direction detecting part 16*a* including an acceleration sensor for measuring acceleration in each of three axes perpendicular to each other, an around-gravitation angle detecting part 16*b* including a magnetic sensor for measuring a magnetic force in each of the above-mentioned three axes, and an attitude calculating part 16*c*. The gravitation direction detecting part 16*a* is connected to the MPU 3, and the around-gravitation angle detecting part 16*b* is connected to the gravitation direction detecting part 16*a*. The attitude calculating part 16*c* is connected to the gravitation direction detecting part 16*a* and around-gravitation angle detecting part 16*b*.

The above-mentioned attitude detecting part 16 may be made of a gyro. This case will be described later.

Figure 6:
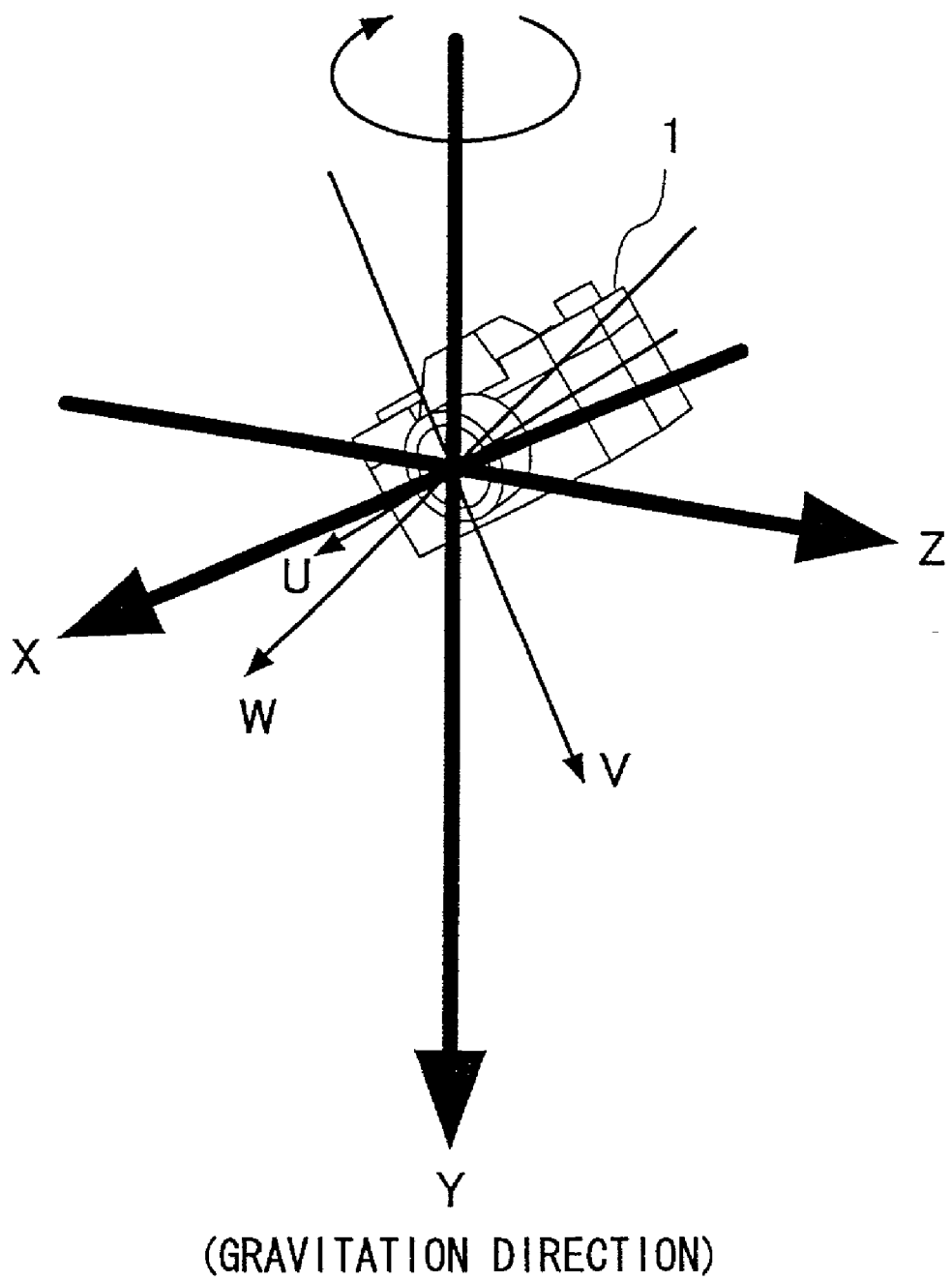
FIG. 6 illustrates attitude angle calculating operation performed by the shape measurement system shown in FIG. 1.

First, an example in which the gravitation direction detecting part 16*a* is made of a three-axis acceleration sensor and the around-gravitation angle detecting part 16*b* is made of two-axis magnetic bearing sensor will now be described In this example, as shown in FIG. 6, an XYZ basic coordinate system (absolute coordinate system) in which Y axis represents the gravitation direction, and a UVW picture taking coordinate system in which W axis represents the optical axis are defined. Then, attitude angles $\theta_U$, $\theta_V$, $\theta_W$ denote inclinations of the picture taking coordinate system with respect to the basic coordinate system, respectively.

As a method of specifying the attitude of the shape measurement system 1, first, from a condition in which the basic coordinate system coincides with the picture taking coordinate system, the shape measurement system 1 is rotated by $\theta_V$ around the V (Y) axis. Then, with respect to the picture taking coordinate system, the shape measurement system 1 is rotated by $\theta_U$ around the U axis. Then, further, with respect to the picture taking coordinate system, the shape measurement system 1 is rotated by $\theta_W$ around the W axis.

Assuming that $R_V$, $R_U$, $R_W$ denote rotation matrixes representing the above-mentioned rotations around the V axis, U axis and W axis, respectively, the attitude of the shape measurement system 1 can be expressed by the following matrix:

$$R = R_V \cdot R_U \cdot R_W \quad (2)$$

$$= \begin{bmatrix} \cos\theta_Y & 0 & \sin\theta_Y \\ 0 & 1 & 0 \\ -\sin\theta_Y & 0 & \cos\theta_Y \end{bmatrix} \cdot \begin{bmatrix} 1 & 0 & 0 \\ 0 & \cos\theta_X & -\sin\theta_X \\ 0 & \sin\theta_X & \cos\theta_X \end{bmatrix} \cdot$$

-continued
$$\begin{bmatrix} \cos\theta_Z & -\sin\theta_Z & 0 \\ \sin\theta_Z & \cos\theta_Z & 0 \\ 0 & 0 & 1 \end{bmatrix}$$

Further, measured values obtained by the acceleration sensor and magnetic bearing sensor are expressed by the following matrix A and matrix M, respectively:

$$A = \begin{pmatrix} A_X \\ A_Y \\ A_Z \end{pmatrix} \quad (3)$$

$$M = \begin{pmatrix} M_X \\ M_Y \\ M_Z \end{pmatrix}$$

$$\|A\| = \|M\| = 1$$

However, when the two-axis magnetic bearing sensor is used, $M_Y$ is indefinite. The gravitational acceleration vector is expressed by the following matrix G:

$$G = \begin{pmatrix} 0 \\ 1 \\ 0 \end{pmatrix} \quad (4)$$

Further, assuming that the magnetic dip $\phi$ of the terrestrial magnetism is already known, the terrestrial magnetism vector is expressed by the following matrix D:

$$D = \begin{pmatrix} 0 \\ \sin\phi \\ \cos\phi \end{pmatrix} \quad (5)$$

The following formula holds between the above-mentioned matrix A and matrix G, and the matrix R to be obtained:

$$R \cdot A = G \quad (6)$$

Accordingly, by multiplying the inverse matrix of the matrix R from the left of both sides of the above-mentioned formula (6), the following formula holds:

$$A = R^{-1} G \quad (7)$$

Thereby, the following attitude angles $\theta_U$ and $\theta_W$ are obtained through the attitude calculating part 16*c*, shown in FIG. 5:

$$\theta_U = -\sin^{-1} A_Z$$

$$\theta_W = \sin^{-1}\left(\frac{A_X}{\cos\theta_U}\right) \quad \text{where: } \sin^{-1}\left(\frac{A_X}{\cos\theta_U}\right) \geq 0, \text{ and } \frac{A_Y}{\theta_U} \geq 0 \quad (8)$$

$$\theta_W = \pi - \sin^{-1}\left(\frac{A_X}{\cos\theta_U}\right) \quad \text{where: } \sin^{-1}\left(\frac{A_X}{\cos\theta_U}\right) \geq 0, \text{ and } \frac{A_Y}{\theta_U} < 0$$

$$\theta_W = -\pi - \sin^{-1}\left(\frac{A_X}{\cos\theta_U}\right) \quad \text{where: } \sin^{-1}\left(\frac{A_X}{\cos\theta_U}\right) < 0, \text{ and } \frac{A_Y}{\theta_U} < 0$$

Further, the following formula holds between the above-mentioned matrix M and matrix D, and the matrix R to be obtained:

$$R \cdot M = D \quad (9)$$

Accordingly, by multiplying the inverse matrix of the matrix R from the left of both sides of the above-mentioned formula (9), the following formula holds:

$$M = R^{-1} \cdot D \quad (10)$$

Thereby, the following formula (11) is derived, and, thus, the attitude angle $\theta_V$ is obtained through the attitude calculating part 16c, shown in FIG. 5:

$$\cos\theta_V = \sec\phi \cdot \sec\theta_{U'}(M_Z + \sin\phi \cdot \sin\theta_U) \sin\theta_V = -\sec\phi \sec\theta_{W'} \sin\theta_{W'}(M_X - \sin\phi \cdot \cos\theta_U - \cos\theta_V \cdot \cos\phi_v \cdot \sin\theta_U) \quad (11)$$

$\theta_V = \sin^{-1}(\sin\theta_V)$ where: $\sin^{-1}(\sin\theta_V) \geq 0$, and $\cos\theta_V \geq 0$ $\theta_V = \pi - \sin^{-1}(\sin\theta_V)$ where: $\sin^{-1}(\sin\theta_V) \geq 0$, and $\cos\theta_V < 0$ $\theta_V = -\pi - \sin^{-1}(\sin\theta_V)$ where: $\sin^{-1}(\sin\theta_V) < 0$, and $\cos\theta_V < 0$ (12)

When $\cos\theta_U$ in the above-mentioned formula (8) is 0, the attitude angle $\theta_W$ can be determined freely.

Through the above-described method, the matrix R shown in the formula (2) is obtained, and, thus, the information specifying the picture taking attitude of the shape measurement system 1 is obtained.

An example in which a three-axis acceleration sensor and a three-axis magnetic bearing sensor are used will now be described. Definition of the coordinate systems and derivation of the attitude angles $\theta_U$, and $\theta_W$ are the same as those described above. However, the magnetic dip of the terrestrial magnetism may be unknown, and the terrestrial magnetism vector is expressed by the following matrix D:

$$D = \begin{pmatrix} 0 \\ D_Y \\ D_Z \end{pmatrix} \quad (13)$$

The matrix D' shown in the following formula (14) is assumed:

$$D' = \begin{pmatrix} D'_X \\ D'_Y \\ D'_Z \end{pmatrix} = R_U \cdot R_W \cdot M \quad (14)$$

Then, by using the above-mentioned matrix D', the above-mentioned matrix D is expressed by the following formula (15):

$$D = R_V \cdot D' \quad (15)$$

Thereby, the following formula (16) holds:

$$\cos\theta_V = \frac{D'_Z \cdot D_Z}{D'^2_X + D'^2_Z}$$

$$\sin\theta_V = \frac{D'_X \cdot D_Z}{D'^2_X + D'^2_Z} \quad (16)$$

Accordingly, the attitude angle $\theta_V$ is obtained as follows, through the attitude calculating part 16c:

$\theta_V = \sin^{-1}(\sin\theta_V)$ where: $\sin^{-1}(\sin\theta_V) \geq 0$, and $\cos\theta_V \geq 0$ $\theta_V = \pi - \sin^{-1}(\sin\theta_V)$ where: $\sin^{-1}(\sin\theta_V) \geq 0$, and $\cos\theta_V < 0$ $\theta_V = -\pi - \sin^{-1}(\sin\theta_V)$ where: $\sin^{-1}(\sin\theta_V) < 0$, and $\cos\theta_V < 0$ (17)

A case where a gyro is used as the attitude detecting part 16 shown in FIG. 1 will now be described. In this case, as will be described, a gyro is disposed so that a rotational angular velocity around each axis of the XYZ basic coordinate system (absolute coordinate system) shown in FIG. 6 can be obtained, and, by integrating the rotational angular velocity detected by the gyro, the angle information can be obtained.

Specifically, assuming that $\alpha$ denotes the rotational angle around X axis, $\beta$ denotes the rotational angle around Y axis, and $\gamma$ denotes the rotational angle around Z axis, shown in FIG. 6, the following rotational angular velocity vector J is measured through the gyro:

$$J = \left( \frac{d\alpha}{dt}, \frac{d\beta}{dt}, \frac{d\gamma}{dt} \right) \quad (18)$$

Then, by integrating the above-mentioned rotational angular velocity vector J, the rotational angles $\alpha$, $\beta$ and $\gamma$ at a time t can be obtained as follows:

$$\alpha = \alpha_0 + \int_0^t d\alpha$$

$$\beta = \beta_0 + \int_0^t d\beta \quad (19)$$

$$\gamma = \gamma_0 + \int_0^t d\gamma$$

Each of the above-mentioned integration coefficients $\alpha_0$, $\beta_0$, $\gamma_0$ is 0 assuming that the initial state at the time t=0 is a static state.

The composing operation for three-dimensional positional data in the step S5 shown in FIG. 3 will now be described in detail. FIGS. 7A through 7D show the composing operation typically. As shown in FIGS. 7A through 7D, one example in which a three-dimensional shape of the subject 20 having a cylindrical shape is measured will now be described.

FIG. 7B show a group of points 27 which represent three-dimensional coordinates corresponding to respective points present on the surface of the subject 20 obtained from calculation in a predetermined coordinate system in a condition in which a picture of the subject 20 has been taken from a viewpoint (direction of picture taking) DB shown in FIG. 7A. Similarly, FIG. 7C show a group of points 28 which represent three-dimensional coordinates corresponding to respective points on the surface of the subject 20 obtained from calculation in a predetermined coordinate system in a condition in which a picture of the subject 20 has been taken from a viewpoint (direction of picture taking) DC shown in FIG. 7A.

As shown in FIGS. 7B and 7C, depending on the direction of picture taking, a side surface, a rear surface, a top surface, or a bottom surface of the subject 20 becomes a blind spot for the picture taking operation, for example. Thereby, it may not be possible to specify a shape of the subject 20 from each group of the thus-obtained groups of points 27 and 28 alone. Accordingly, as shown in FIG. 7D, the groups of points 27 and 28 shown in FIGS. 7B and 7C are combined in a same/single coordinate system. Thereby, a group of points 29 by which a three-dimensional shape of the subject 20 can be specified can be obtained.

As the number of viewpoints from which a picture of a subject 20 is taken becomes larger, many groups of points will be obtained, and, thereby, it is possible to obtain a three-dimensional shape of the subject 20 more perfectly.

The above-mentioned composing operation will now be described in more detail. Specifically, an example in which two sets of three-dimensional positional data obtained through taking a picture of the subject 20 from the viewpoints DB and DC shown in FIG. 7A will now be described. However, it is also possible to combine more than two sets of three-dimensional positional data.

With regard to taking a picture from the viewpoint DB, assuming that a rotational angle (Bx, By, Bz) around the XYZ axes shown in FIG. 6 from a basic attitude is given, a rotational matrix RB for coordinate conversion from this basic attitude into the attitude of the viewpoint DB is expressed by the following formula (20):

$$RB = \begin{bmatrix} \cos By \cos Bz & -\cos Bx \sin Bz + \sin Bx \sin By \cos Bz & \sin Bx \sin Bz + \cos Bx \sin By \cos Bz \\ \cos By \sin Bz & \cos Bx \cos Bz + \sin Bx \sin By \sin Bz & -\sin Bx \cos Bz + \cos Bx \sin By \sin Bz \\ -\sin By & \sin Bx \cos By & \cos Bx \cos By \end{bmatrix} \quad (20)$$

where it is assumed that the above-mentioned rotation is performed in the order of around X axis, around Y axis, and, then, around Z axis.

Similarly, with regard to taking a picture from the viewpoint DC, assuming that a rotational angle (Cx, Cy, Cz) around the XYZ axes shown in FIG. 6 from a basic attitude is given, a rotational matrix RC for coordinate conversion from this basic attitude into the attitude of the viewpoint DC is expressed by the following formula (21):

$$Rc = \begin{bmatrix} \cos Cy \cos Cz & -\cos Cx \sin Cz + \sin Cx \sin Cy \cos Cz & \sin Cx \sin Cz + \cos Cx \sin Cy \cos Cz \\ \cos Cy \sin Cz & \cos Cx \cos Cz + \sin Cx \sin Cy \sin Cz & -\sin Cx \cos Cz + \cos Cx \sin Cy \sin Cz \\ -\sin Cy & \sin Cx \cos Cy & \cos Cx \cos Cy \end{bmatrix} \quad (21)$$

Accordingly, a rotational matrix RR of converting a positional coordinate in the attitude (picture taking coordinate system) of the viewpoint DB into a positional coordinate in the attitude (picture taking coordinate system) of the viewpoint DC is expressed by the following:

$$RR = (RB)^{-1} RC \quad (22)$$

Accordingly, a point having a positional coordinate b in the attitude (picture taking coordinate system) of the viewpoint DB is expressed by a positional coordinate obtained from RR·b in the attitude (picture taking coordinate system) of the viewpoint DC, for example. However, the above-mentioned matrix RR can perform coordinate conversion only for a rotational component. Accordingly, it is necessary to further perform conversion (shift) for a translation component.

Figure 8A:
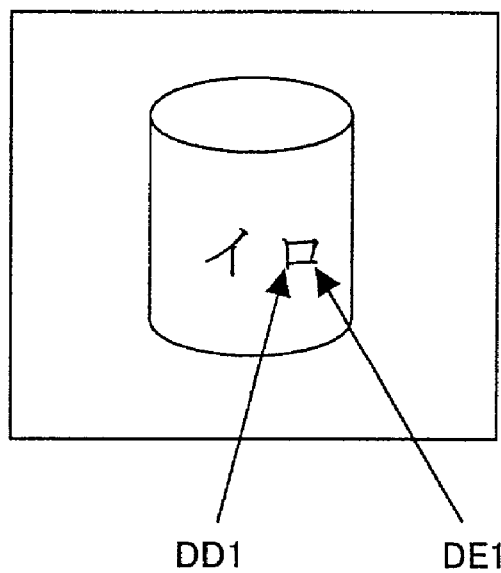
Figure 8B:
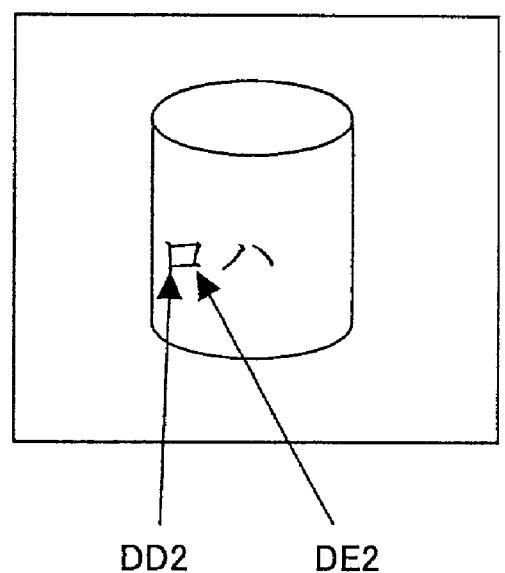

For this purpose, points corresponding to one another between the two images obtained from picture taking operations from the viewpoint DB and viewpoint DC are found out. For example, in both images shown in FIGS. 8A and 8B, points DD1 and DD2 correspond to one another, and points DE1 and DE2 correspond to one another.

For each point mentioned above, a three-dimensional coordinate in the picture taking coordinate system at the viewpoint DB or viewpoint DC is obtained. A positional difference in three-dimensional space obtained from removing a difference in rotational component through coordinate conversion by using the above-mentioned matrix RR performed on a three-dimensional coordinate in the picture taking coordinate system of the viewpoint DB is a required shift amount (translation movement amount). That is, assuming that b and c denote positional coordinates of corresponding points in the picture taking coordinate systems of the viewpoint DB and viewpoint DC, respectively, the above-mentioned shift amount s is obtained from $$s = (RR \cdot b) - c$$

The above-mentioned shift amount s for all the corresponding points should be the same vector. However, in many cases, it has a different value due to noise or as result of erroneous corresponding points being taken. Accordingly, an average of the above-mentioned shift amounts calculated for the respective corresponding points is used as the translation component between the viewpoints DB and DC. Further, instead of such averaging, the shift amount calculated from corresponding points for which there is a low possibility that a proper correspondence relationship is not obtained may be used as the translation component.

Then, all the three-dimensional coordinates in one picture taking coordinate system are shifted by the thus-obtained shift amount, and, as mentioned above, the three-dimensional coordinates in both picture taking coordinate systems are combined in a single coordinate system. At this occasion, when corresponding points do not completely coincide with one another, the position of center of gravity between the corresponding points (mid point therebetween when the corresponding points are two points) is used as a final three-dimensional coordinate. Thereby, it is possible to obtain a three-dimensional shape of the subject at a high accuracy.

Figure 9:
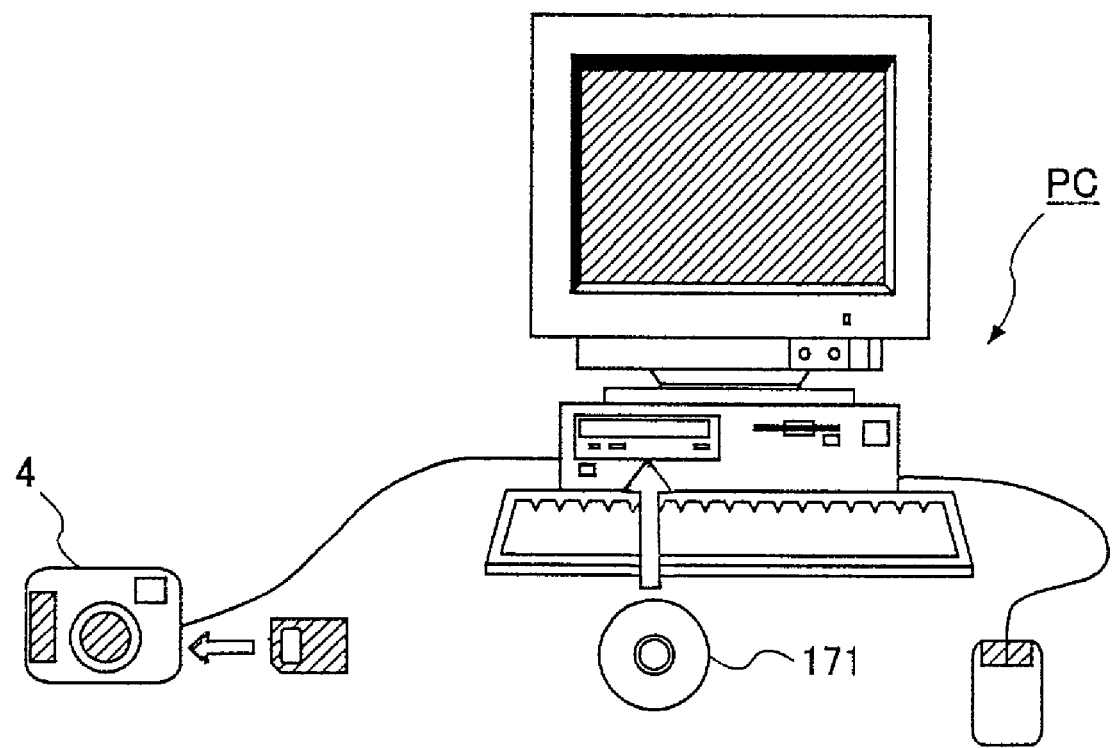
FIG. 9 shows an example in which the shape measurement system shown in FIG. 1 is embodied by a camera and a personal computer.

The above-described shape measurement system 1 can be made of a camera 4 and a personal computer PC as shown in FIG. 9. That is, as shown in FIG. 10, in the camera 4, all the parts other than the 3D position calculating part 15 and three-dimensional position composing part 17 shown in FIG. 1 are contained in a single housing, while, the 3D position calculating part 17 and three-dimensional position composing part 17 are embodied by the personal computer PC separate from the camera 4.

In the shape measurement system having this configuration, an image signal and information representing picture taking attitude are obtained by the camera 4 first, and are stored in the image memory 13. Then, the image signal and information representing the picture taking attitude stored in the image memory 13 are recorded into a carriable recording medium such as a SmartMedia or the like. Thereby, by loading this carriable recording medium into the personal computer PC, these signal and information are taken by a memory/communication interface part 19. Instead of using the carriable recording medium as mentioned above, it is also possible that, through a communication device not shown in the figure, the signal and information are transmitted into the memory/communication interface part 19 wirelessly.

Figure 10:
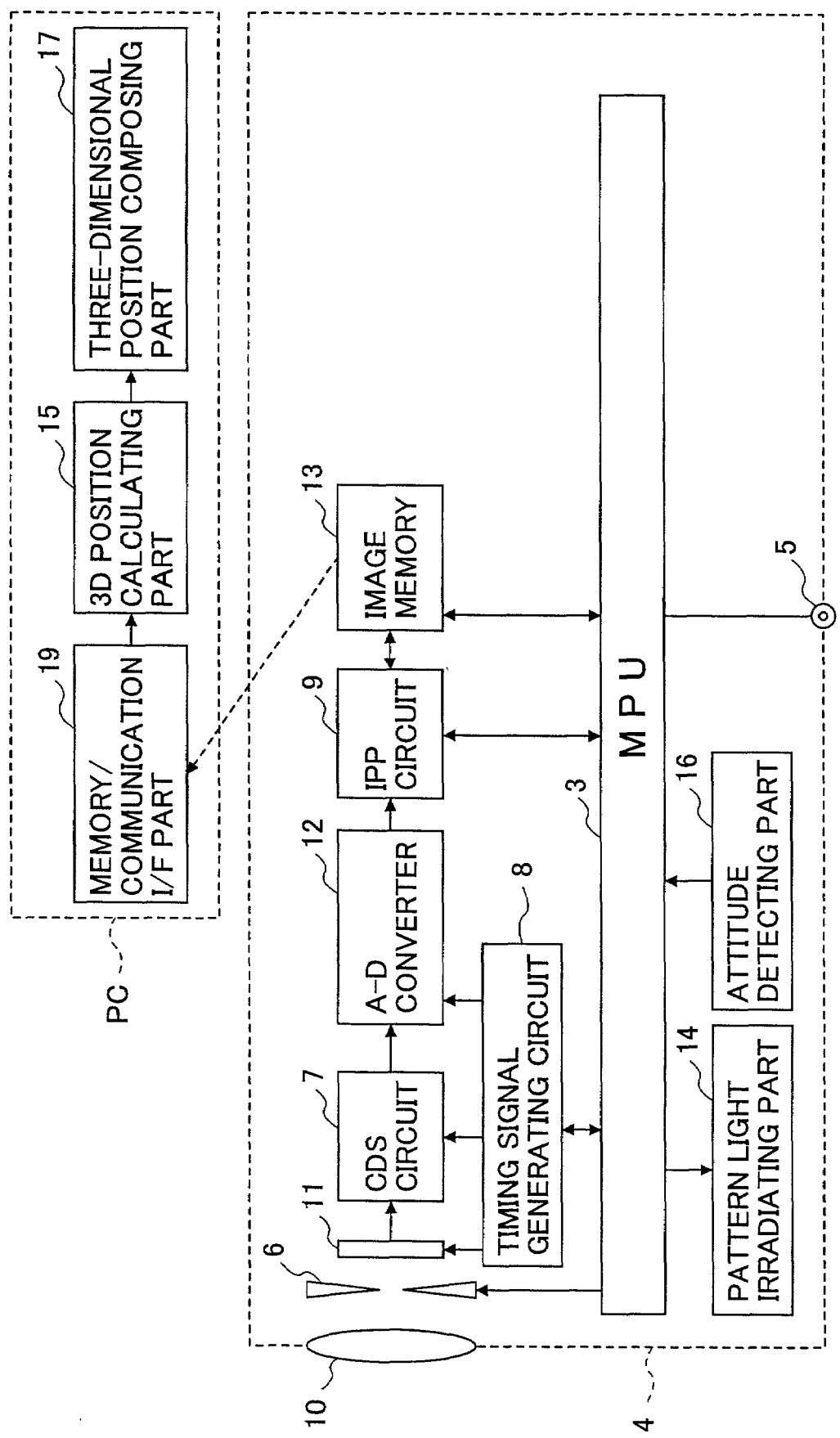
FIG. 10 shows a block diagram of the camera and personal computer shown in FIG. 9.

Thus, in the shape measurement system shown in FIGS. 9 and 10, according to the signal and information taken into the memory/communication interface part 19, the personal computer PC calculates three-dimensional coordinates corresponding to respective points on the surface of a subject, and, thus, generates a three-dimensional image of the subject.

Figure 11:
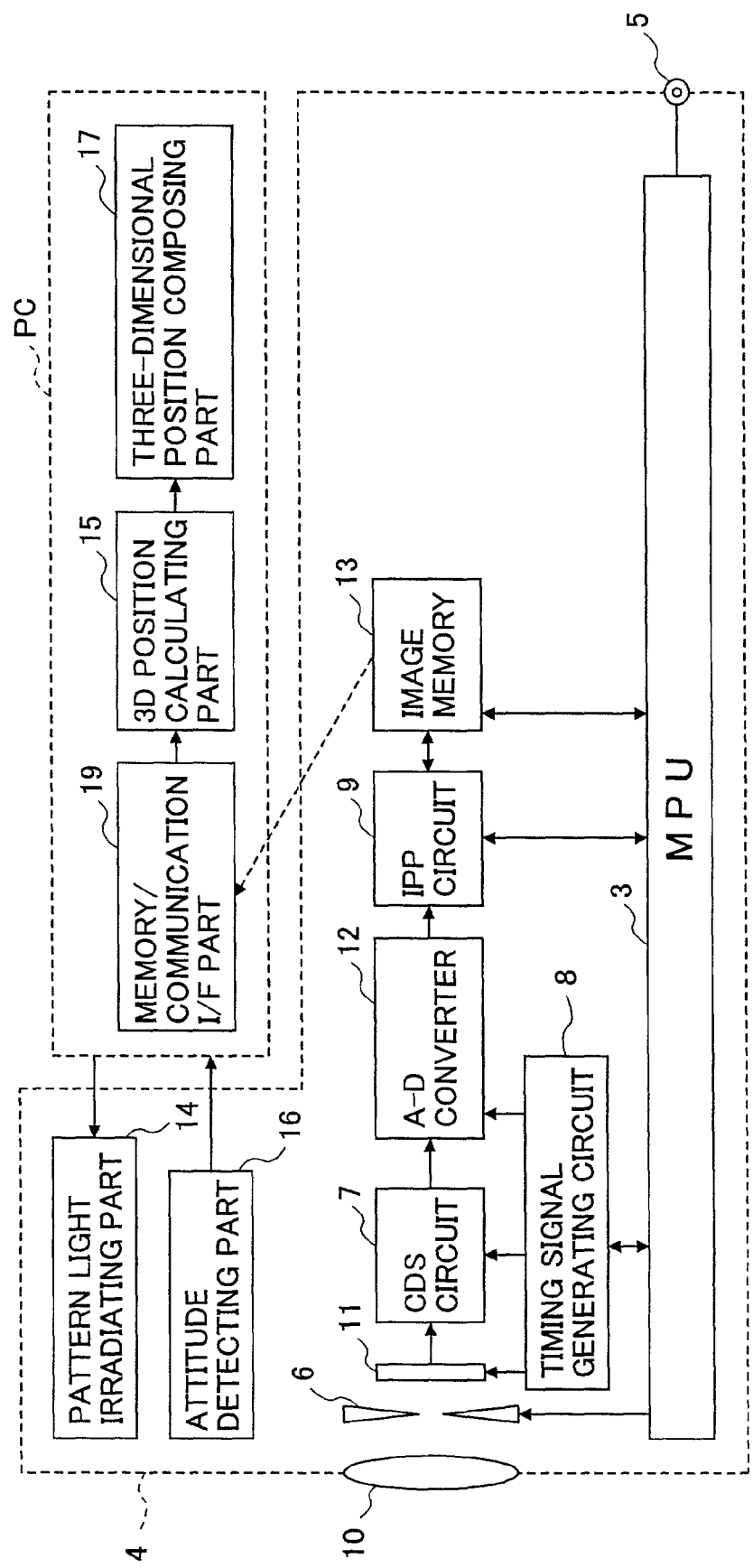
FIG. 11 shows another example in which the shape measurement system shown in FIG. 1 is embodied by a camera and a personal computer.

Further, in the shape measurement system shown in FIG. 10, the pattern light irradiating part 14 and attitude detecting part 16 are controlled by the MPU 3 included in the camera 4. However, instead thereof, it is also possible that, as shown in FIG. 11, they may be controlled by control signals provided by the personal computer PC.

Figure 12:
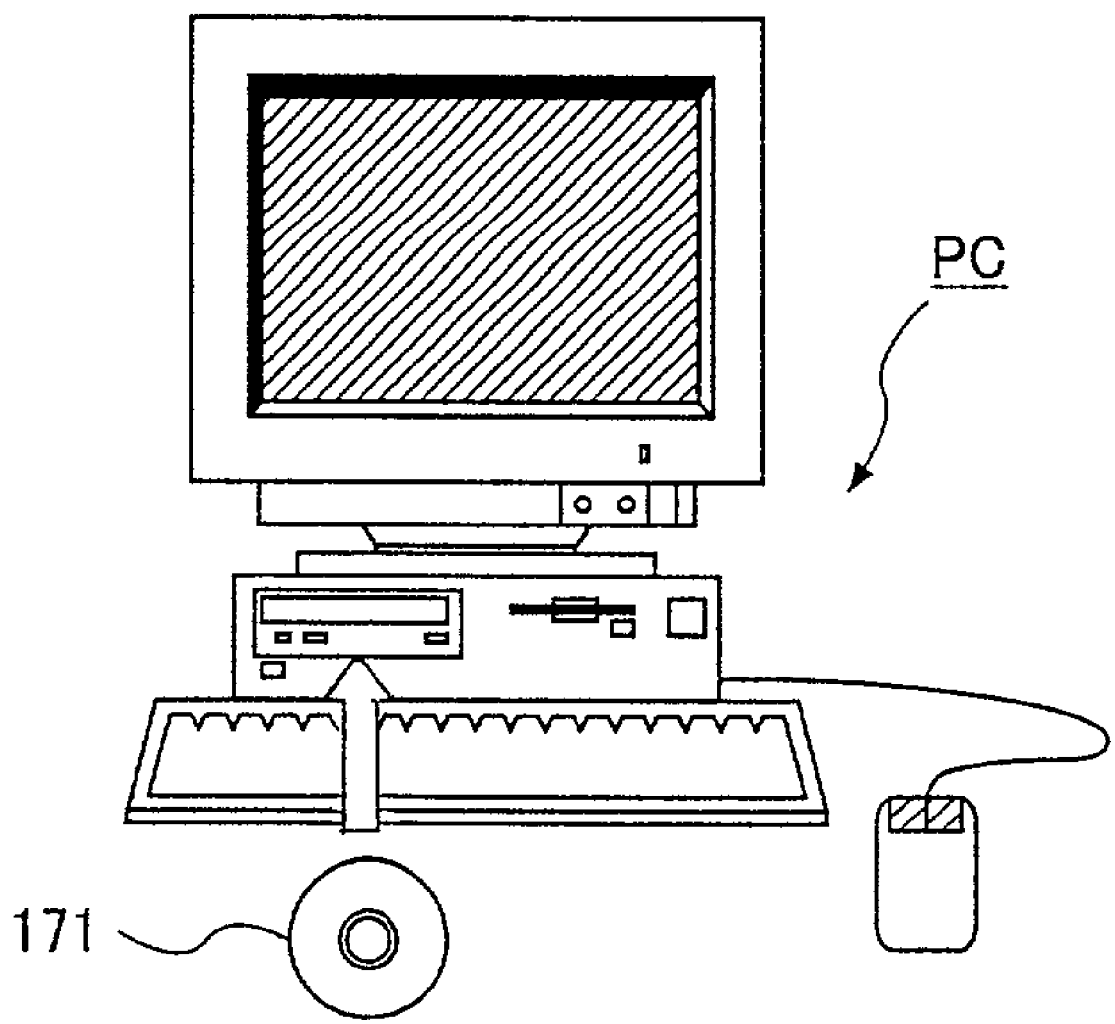
FIG. 12 shows an example in which the shape measurement system shown in the first embodiment of the present invention is embodied by a computer software executed by a personal computer.

Further, it is also possible that the above-described functions/operations of the shape measurement system 1 may be embodied by a software program. That is, these functions/operations may be described by instructions of a computer program, and, as a result of this program being executed by the MPU 3, these functions/operations can be easily achieved. In this occasion, the program may be previously recorded into a recording medium such as a CD-ROM 171, or the like, shown in FIG. 12, then, as shown in the figure, this recording medium may be loaded into the personal computer PC, and, thus, the program is read by and executed by the MPU 3.

Thus, according to the shape measurement system 1 in the first embodiment of the present invention, an attitude (viewpoint) at which a picture of a subject is taken is detected by the attitude detecting part 16, and, according to the thus-detected attitudes and images obtained through the picture taking operation, a three-dimensional shape of the subject can be obtained. Accordingly, it is possible to provide a miniaturized and inexpensive shape measurement system.

Further, through the camera 2 shown in FIG. 2, by taking pictures of a subject while moving the camera 2 by hands, it is possible to obtain a three-dimensional shape of the subject through the camera 2. Accordingly, it is possible to easily measure a three-dimensional shape for any of variable types of subjects.

Figure 13:
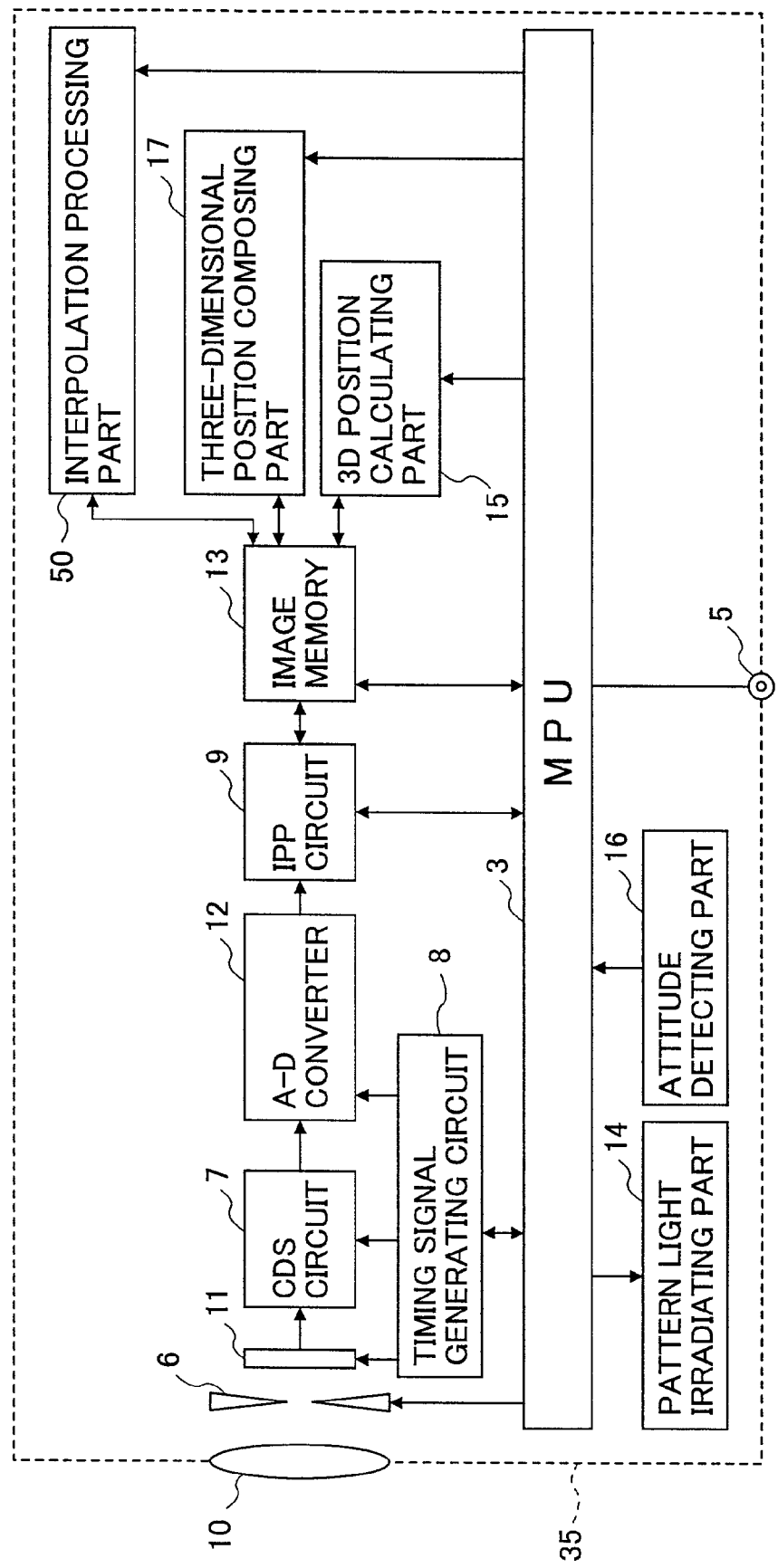
FIG. 13 shows a block diagram of a shape measurement system in a second embodiment according to the present invention.

FIG. 13 shows a block diagram of a shape measurement system in a second embodiment of the present invention.

As shown in the figure, the shape measurement system 35 in the second embodiment has the same configuration as the shape measurement system 1 in the first embodiment shown in FIG. 1 except that an interpolation processing part 50 is added.

The interpolation processing part 50 is controlled by the MPU 3, and is connected to the image memory 13.

Figure 14A:
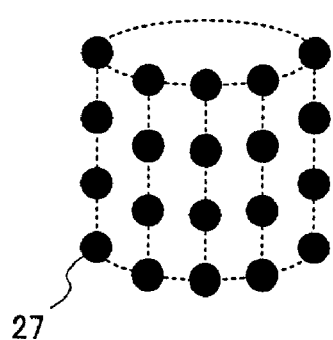
FIGS. 14A and 14B illustrate interpolation processing performed by the shape measurement system shown in FIG. 13.
Figure 14B:
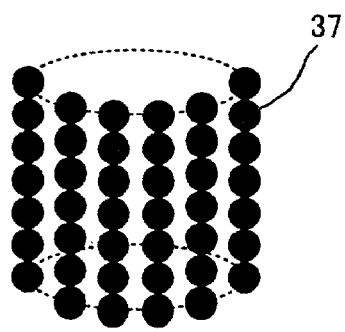

The shape measurement system 35 having the configuration shown in FIG. 13 operates similarly to the shape measurement system 1 in the first embodiment shown in FIG. 1. However, the interpolation processing part 50 operates, as follows:

In the above-mentioned three-dimensional positional data obtained through taking pictures of a subject, the data may not necessarily be present in a required spatial resolution in a three-dimensional coordinate system. Therefore, in a case where a group of points 27 shown in FIG. 14A are obtained, for example, interpolation points 37 may be added so as to result in a finer arrangement of points in the three-dimensional coordinate system, as shown in FIG. 14B.

As a method of the above-mentioned interpolation, any conventional method such as that employing a spline function for obtaining an approximation curve connecting such a group of points, or the like, can be employed.

Figure 15A:
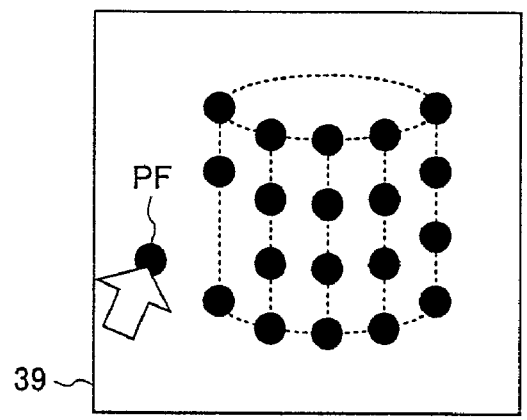
FIGS. 15A and 15B illustrate correction processing performed by the shape measurement system shown in FIG. 13.
Figure 15B:
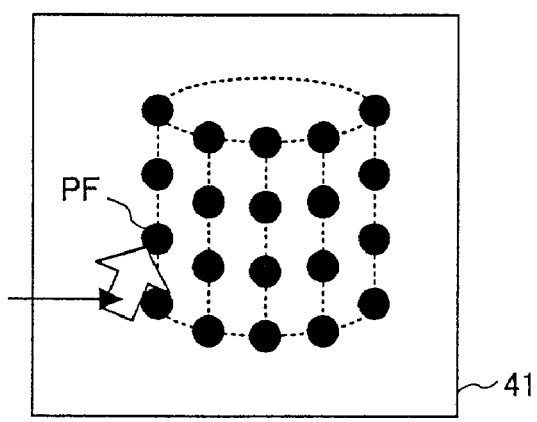

Further, the above-mentioned interpolation processing part 50 may also perform correction processing as will now be described. That is, when an erroneously processed point PF is found out which is obviously discrete from a group of points included in an image 39 obtained, as shown in FIG. 15A, a user may specify this point PF by a pointer (indicated by an arrow in the figure) through a mouse operation, and, then, move it to a desired position, or delete it. Thus, it is possible to correct the erroneously processed point PF. Then, by performing this correction processing, it is possible to obtain a proper image 41 shown in FIG. 15B.

It is preferable that correction processing such as that described above is performed before the above-mentioned interpolation processing is performed.

Figure 16:
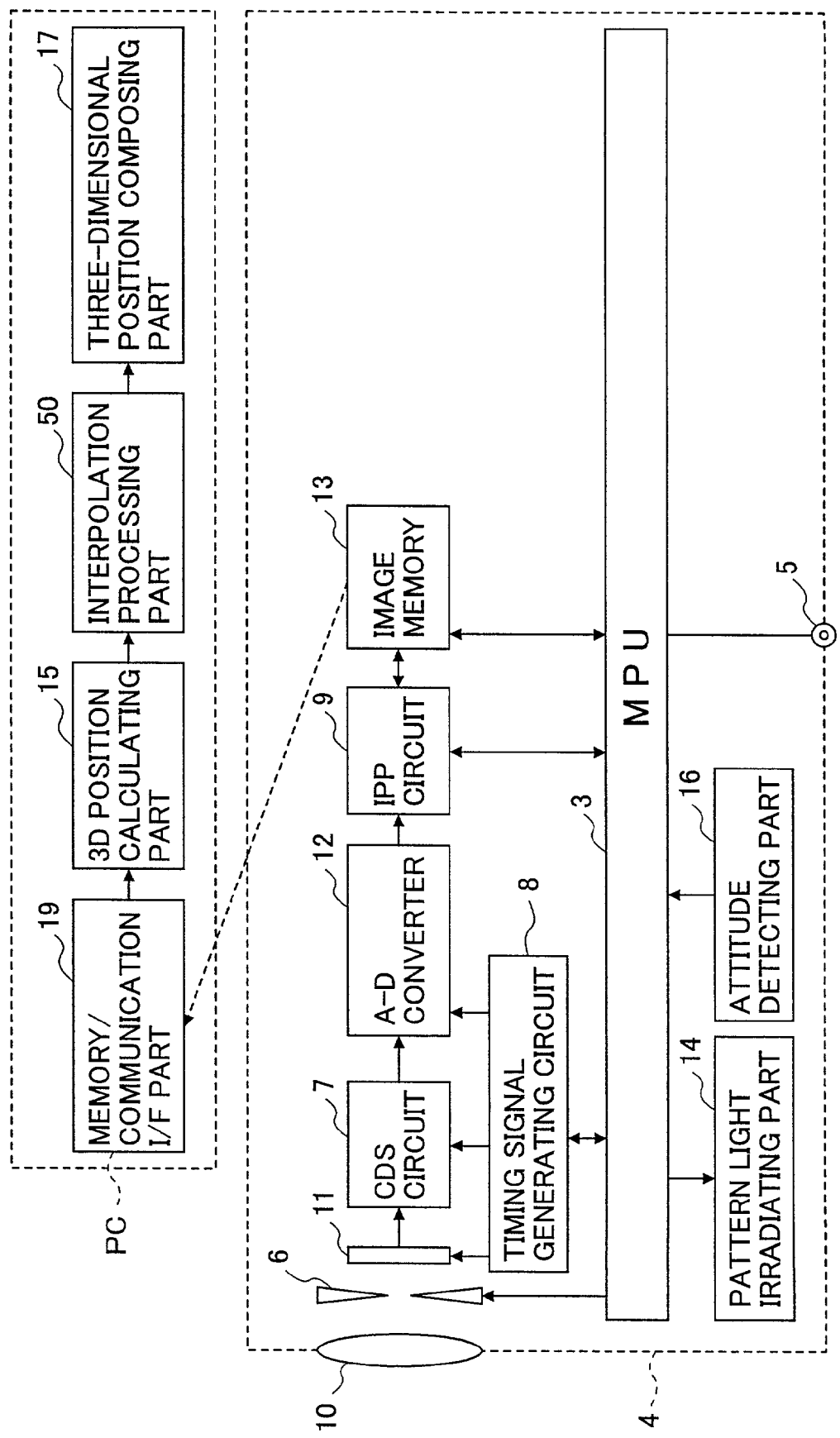
FIG. 16 shows an example in which the shape measurement system shown in FIG. 13 is embodied by a personal computer and a camera.

Further, it is possible that the above-mentioned interpolation processing part 50 is contained in a housing together with the other parts/components, and, thus, a camera is made. Alternatively, it is also possible that, as shown in FIG. 16, the interpolation processing part 50 is provided between the 3D position calculating part 15 and three-dimensional position composing part 17 in the personal computer PC.

Thus, according to the shape measurement system 35 in the second embodiment, advantages which are obtained from the above-mentioned shape measurement system 1 in the first embodiment are obtained, and, also, three-dimensional positional data is interpolated or corrected by the interpolation processing part 50, and, thereby, it is possible to obtain a three-dimensional shape of a subject at a higher accuracy.

Furthermore, according to the shape measurement system 35 in the second embodiment, as interpolation such as that mentioned above can be made, it is possible to employ the pattern light irradiating part 14 for projecting a predetermined pattern onto a subject having a simplified configuration. Accordingly, it is possible to miniaturize the shape measurement system.

Further, according to the shape measurement system 35 in the second embodiment, as interpolation such as that mentioned above can be made, it is possible to avoid influence of an unexpected movement of the system 35 when a picture of a subject is taken through the system 35 while it is held by hands, or the like. Thereby, it is possible to obtain a three-dimensional shape of the subject at a higher accuracy.

Same as for the shape measurement system 1 in the first embodiment, the above-described functions/operations of the shape measurement system 35 in the second embodiment may be embodied by a software program.

Figure 17:
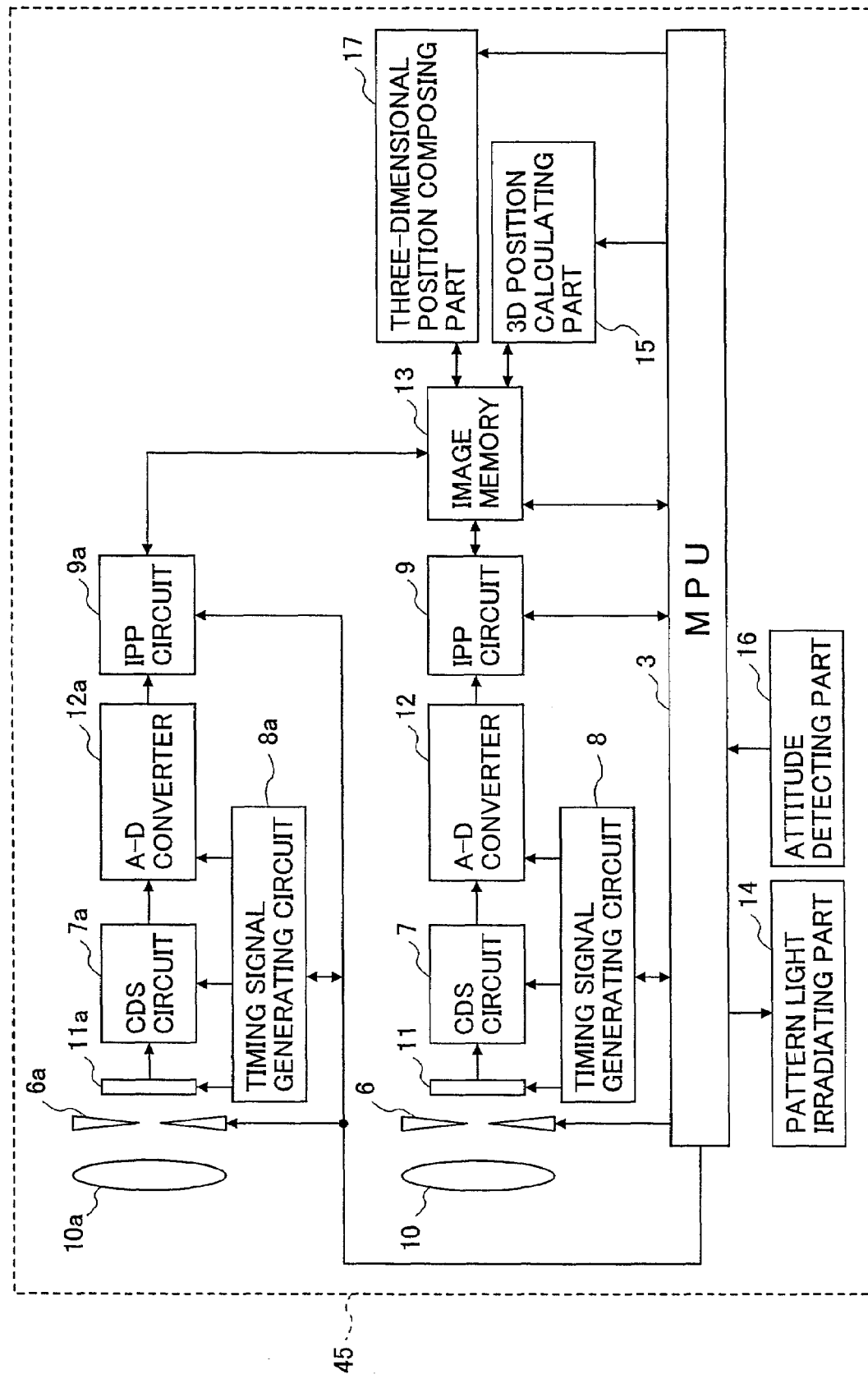
FIG. 17 shows a block diagram of a shape measurement system in a third embodiment according to the present invention.

FIG. 17 shows a block diagram of a shape measurement system in a third embodiment of the present invention.

As shown in FIG. 17, the shape measurement system 45 in the third embodiment has the same configuration as that of the shape measurement system 1 in the first embodiment except that a lens 10*a*, a stop mechanism 6*a*, a picture taking device 11*a*, a CDS circuit 7*a*, an A-D converter 12*a*, a timing signal generating circuit 8*a*, and an IPP circuit 9*a* are added. The stop mechanism 6*a*, timing signal generating circuit 8*a* and IPP circuit 9*a* are controlled by the MPU 3. The picture taking device 11a, CDS circuit 7a and A-D converter 12a operate according to signals provided by the timing signal generating circuit 8a. The IPP circuit 9a is connected to the image memory 18.

In the shape measurement system 45 in the third embodiment, the two picture taking systems including lenses, CCDs and so forth, respectively, are provided in a manner such that the optical centers thereof are different from one another. The difference between the optical centers, difference between optical axes in angle and so forth between these two picture taking systems are previously obtained precisely.

The shape measurement system 45 in the third embodiment having the above-described configuration operates similarly to the above-mentioned shape measurement system 1 in the first embodiment. However, through one picture taking operation performed on a subject, two images of the subject can be obtained through the two lenses 10 and 10a. Thereby, it is possible to obtain two sets of three-dimensional positional data through one picture taking operation.

Accordingly, according to the shape measurement system 45 in the third embodiment, by combining all of the plurality of sets of three-dimensional positional data thus-obtained into a single coordinate system, it is possible to improve the accuracy of a finally obtained three-dimensional shape of the subject.

Although the above-described third embodiment includes the two picture taking systems, the present invention includes a shape measurement system in another embodiment which includes more than two picture taking systems.

Same as for the shape measurement systems 1 and 35 in the first and second embodiments, the above-described functions/operations of the shape measurement system 45 in the third embodiment may also be embodied by a software program.

Further, the present invention is not limited to the above-described embodiments, and variations and modifications may be made without departing from the scope of the present invention.

The present application is based on Japanese priority application No. 2000-240470, filed on Aug. 8, 2000, the entire contents of which are hereby incorporated by reference.

What is claimed is:

1. A shape measurement system for measuring a three-dimensional shape of an object, comprising:
   a picture taking part taking a picture of the object;
   a projecting part applying light having a predetermined pattern onto the object;
   a rotation component detecting part detecting, based on a gravity direction and an angle around the gravity direction by a sensor, a rotation component of position information specifying a position to take a picture of the object by the picture taking part;
   a three-dimensional coordinate calculating part calculating a three-dimensional coordinate of each point of the object based on the rotation component and an image taken at the position; and
   a three-dimensional shape composing part calculating a translation component of the position information, based on at least two of the three-dimensional coordinates for each point of the object calculated by said three-dimensional coordinate calculating part, based on each image obtained from taking a picture of the object, to which the light is applied from at least two different positions, and the rotation component, and expressing said each point, based on the translation component, by a coordinate in a single coordinate system, and to produce a composed image.

2. The shape measurement system as claimed in claim 1, further comprising a three-dimensional image generating part generating a three-dimensional image of the object in accordance with coordinates of the object obtained by said three-dimensional coordinate calculating part and an image obtained when the light having the predetermined pattern is not applied to the object by said picture taking part.

3. The shape measurement system as claimed in claim 1, wherein the three-dimensional shape composing part calculates a rotation component applied for producing the composed image based on respective attitude angles from which the images are taken from the different positions.

4. The shape measurement system as claimed in claim 1, wherein the three-dimensional shape composing part finds corresponding points among the images taken from the different positions, and calculates a translation component applied for producing the composed image.

5. The shape measurement system as claimed in claim 1, further comprising:
   a picture taking control part controlling operation timing of said picture taking part;
   a signal converting part converting an analog signal obtained by said picture taking part into a digital signal; and
   a storing part storing the digital signal, three-dimensional coordinate and composite image.

6. The shape measurement system as claimed in claim 5, further comprising an interpolation part performing interpolation processing on at least one of the image obtained by said picture taking part and the composite image obtained by said three-dimensional shape composing part.

7. A shape measurement system for measuring a three-dimensional shape of an object, comprising:
   a plurality of picture taking parts with different optical centers taking pictures of the object;
   a projecting part applying light having a predetermined pattern onto the object;
   a rotation component detecting part detecting, based on a gravity direction and an angle around the gravity direction by a sensor, a rotation component of position information specifying a position to take a picture of the object by the picture taking part;
   a three-dimensional coordinate calculating part calculating a three-dimensional coordinate of each point of the object for each image based on a plurality of images obtained as a result of pictures of the object being taken by said plurality of picture taking parts, and the rotation component; and
   a three-dimensional shape composing part calculating a translation component of the position information, based on at least two of the three-dimensional coordinates for each point of the object calculated by said three-dimensional coordinate calculating part, based on each image obtained from taking a picture of the object, to which the light is applied from at least two different positions, and the rotation component, and expressing said each point, based on the translation component, by a coordinate in a single coordinate system, and to produce a composed image.

8. The shape measurement system as claimed in claim 7, further comprising:
   a plurality of picture taking control parts controlling operation timing of said plurality of picture taking parts, respectively;

a plurality of signal converting parts converting analog signals obtained by said plurality of picture taking parts into digital signals, respectively; and a storing part storing the digital signals obtained by said plurality of signal converting parts, three-dimensional coordinate calculated by said three-dimensional coordinate calculating part and composite image generated by said three-dimensional shape composing part.

9. The shape measurement system as claimed in claim 7, wherein the three-dimensional shape composing part calculates a rotation component applied for producing the composed image based on respective attitude angles from which the images are taken from the different positions.

10. The shape measurement system as claimed in claim 7, wherein the three-dimensional shape composing part finds corresponding points among the images taken from the different positions, and calculates a translation component applied for producing the composed image.

11. A shape measurement system for measuring a three-dimensional shape of an object, comprising a picture taking device taking a picture of an object and a computer:
wherein:
said picture taking device comprises:
a projecting part applying light having a predetermined pattern onto the object; and
a rotation component detecting part detecting, based on a gravity direction and an angle around the gravity direction by a sensor, a rotation component of position information specifying a position to take a picture of the object by the picture taking part; and
said computer comprises:
a three-dimensional coordinate calculating part calculating a three-dimensional coordinate of each point of the object based on the rotation component of the position information provided by the picture taking device and an image taken at the position; and
a three-dimensional shape composing part calculating a translation component of the position information, based on at least two of the three-dimensional coordinates for each point of the object calculated by said three-dimensional coordinate calculating part, based on each image obtained from taking a picture of the object, to which the light is applied from at least two different positions, and the rotation component, and expressing said each point, based on the translation component, by a coordinate in a single coordinate system, and to produce a composed image.

12. The shape measurement system as claimed in claim 11, wherein said computer further comprising an interpolation part performing interpolation processing on the plurality of three-dimensional coordinates calculated by said three-dimensional coordinate calculating part.

13. The shape measurement system as claimed in claim 11, wherein at least one of said projecting part and rotation component detecting part is controlled by said computer.

14. The shape measurement system as claimed in claim 11, wherein the three-dimensional shape composing part calculates a rotation component applied for producing the composed image based on respective attitude angles from which the images are taken from the different positions.

15. The shape measurement system as claimed in claim 11, wherein the three-dimensional shape composing part finds corresponding points among the images taken from the different positions, and calculates a translation component applied for producing the composed image.

16. A picture taking device comprising a picture taking part taking a picture of an object, and further comprising:

a projecting part applying light having a predetermined pattern onto the object;
a rotation component detecting part detecting, based on a gravity direction and an angle around the gravity direction by a sensor, a rotation component of position information specifying a position to take a picture of the object by the picture taking part;
a storing part storing an image obtained as a result of the picture of the object on which the light is applied being taken by said picture taking part, and the position information;
a three-dimensional coordinate calculating part calculating a three-dimensional coordinate of each point of the object based on the rotation component and an image taken at the position; and
a three-dimensional shape composing part calculating a translation component of the position information, based on at least two of the three-dimensional coordinates for each point of the object calculated by said three-dimensional coordinate calculating part, based on each image obtained from taking a picture of the object, to which the light is applied from at least two different positions, and the rotation component, and expressing said each point, based on the translation component, by a coordinate in a single coordinate system, and to produce a composed image.

17. The picture taking device as claimed in claim 16, wherein at least one of said projecting part and said rotation component detecting part is controlled by a control signal provided externally.

18. The picture taking device as claimed in claim 16, wherein said picture taking part also takes a picture of the object onto which the light having the predetermined pattern is not applied.

19. A shape measurement method of measuring a three-dimensional shape of an object, comprising the steps of:
a) applying light having a predetermined pattern onto the object to take a picture of the object;
b) detecting, based on a gravity direction and an angle around the gravity direction by a sensor, a rotation component of position information specifying a position to take a picture of the object;
c) calculating a three-dimensional coordinate of each point of the object based on the rotation component of the position information and an image obtained as a result of the picture being taken at the position; and
d) calculating a translation component of the position information, based on at least two of the three-dimensional coordinates for each point of the object calculated, based on each image obtained from taking a picture of the object, to which the light is applied from at least two different positions, and the rotation component, and expressing said each point, based on the translation component, by a coordinate in a single coordinate system, and to produce a composed image.

20. The method as claimed in claim 19, further comprising the step of:
e) generating a three-dimensional image of the object in accordance with coordinates of the object in the coordinate system, and an image of the object obtained in said step a) when the light having the predetermined is not applied thereonto.

21. The method as claimed in claim 19, wherein the calculating d) calculates a rotation component applied for producing the composed image based on respective attitude angles from which the images are taken from the different positions.

22. The method as claimed in claim 19, wherein the calculating d) finds corresponding points among the images taken from the different positions, and calculates a translation component applied for producing the composed image.

23. A shape measurement method of measuring a three-dimensional shape of an object, comprising the steps of:
 a) applying light having a predetermined pattern onto the object;
 b) taking pictures of the object through a plurality of picture taking parts having different optical centers;
 c) detecting, based on a gravity direction and an angle around the gravity direction by a sensor, a rotation component of position information specifying a position to take a picture of the object;
 d) calculating a three-dimensional coordinate of each point of the object for each image based on a plurality of images obtained as a result of pictures of the object on which the light being taken by said plurality of picture taking parts, and the rotation component generated in said step e); and
 e) calculating a translation component of the position information, based on at least two of the three-dimensional coordinates for each point of the object calculated, based on each image obtained from taking a picture of the object, to which the light is applied from at least two different positions, and the rotation component, and expressing said each point, based on the translation component, by a coordinate in a single coordinate system, and to produce a composed image.

24. The method as claimed in claim 23, wherein the calculating d) calculates a rotation component applied for producing the composed image based on respective attitude angles from which the images are taken from the different positions.

25. The method as claimed in claim 23, wherein the calculating d) finds corresponding points among the images taken from the different positions, and calculates a translation component applied for producing the composed image.

26. A computer readable recording medium storing a program for measuring a three-dimensional shape of an object through a computer, said program causing the computer to:
 calculate a three-dimensional coordinate of each point of the object based on an image obtained as a result of a picture of the object taken, on which light having a predetermined pattern is applied being taken, and a rotation component of position information specifying a position to take a picture of the object;
 calculate a translation component of the position information, based on at least two of the three-dimensional coordinates for each point of the object calculated, based on each image obtained from taking a picture of the object, to which the light is applied from at least two different positions, and the rotation component, and expressing said each point, based on the translation component; and
 produce a composed image based on the calculations.

27. The computer readable recording medium as claimed in claim 26, wherein said program causes
 an acceleration sensor to generate the position information specifying the position with respect to the gravitation; and
 a magnetic sensor to generate the position information specifying the position with respect to the terrestrial magnetism.

28. The computer readable recording medium as claimed in claim 26, wherein said program causes an angular velocity sensor to detect a rotational angular velocity around each coordinate axis of the three-dimensional coordinate system.

29. The computer readable recording medium as claimed in claim 26, wherein said program further causes the computer to generate a three-dimensional image of the object in accordance with the coordinates of the object in the single coordinate system, and an image of the object obtained through taking picture of the object on which the light having the predetermined is not applied.

30. The computer readable recording medium as claimed in claim 26, wherein the program causing the computer to further calculate a rotation component applied for producing the composed image based on respective attitude angles from which the images are taken from the different positions.

31. The computer readable recording medium as claimed in claim 26, wherein the program causing the computer to further find corresponding points among the images taken from the different positions, and calculates a translation component applied for producing the composed image.

32. A computer readable recording medium storing a program for measuring a three-dimensional shape of an object through a computer, said program causing the computer to:
 take a picture of the object;
 apply light having a predetermined pattern onto the object;
 detect, based on a gravity direction and an angle around the gravity direction by a sensor, a rotation component of position information specifying a position to take a picture of the object by the picture taking part;
 calculate a three-dimensional coordinate of each point of the object for each image based on a plurality of images on which light of a predetermined position is applied being taken by a plurality of picture taking parts, and rotation components of a plurality of position information specifying respective positions of the plurality of picture taking parts taking a picture of the object; and
 calculate a translation component of the position information, based on the plurality of three-dimensional coordinates for each point of the object calculated and the rotation component, and expressing said each point, based on the translation component.

33. The computer readable recording medium as claimed in claim 32, wherein the program causing the computer to further calculate a rotation component applied for producing the composed image based on respective attitude angles from which the images are taken from the different positions.

34. The computer readable recording medium as claimed in claim 32, wherein the program causing the computer to further find corresponding points among the images taken from the different positions, and calculates a translation component applied for producing the composed image.

* * * * *